US00RE49589E

(19) United States
(12) Reissued Patent
Wu et al.

(10) Patent Number: US RE49,589 E
(45) Date of Reissued Patent: Jul. 25, 2023

(54) PUMP UNIT AND HANDHELD HIGH PRESSURE WASHER

(71) Applicant: Positec Power Tools (Suzhou) Co., Ltd, Suzhou (CN)

(72) Inventors: Pinghua Wu, Suzhou (CN); Yong Qiao, Suzhou (CN); Haijun Zhang, Suzhou (CN)

(73) Assignee: Positec Power Tools (Suzhou) Co., Ltd, Suzhou (CN)

(21) Appl. No.: 17/234,632

(22) Filed: Apr. 19, 2021

Related U.S. Patent Documents

Reissue of:
(64) Patent No.: 10,968,899
Issued: Apr. 6, 2021
Appl. No.: 15/518,205
PCT Filed: Nov. 21, 2016
PCT No.: PCT/CN2016/106663
§ 371 (c)(1),
(2) Date: Jul. 23, 2018
PCT Pub. No.: WO2017/084633
PCT Pub. Date: May 26, 2017

(30) Foreign Application Priority Data

Nov. 20, 2015 (CN) ..... 201510810513.3

(51) Int. Cl.
*F04B 1/16* (2006.01)
*B08B 3/02* (2006.01)
(Continued)

(52) U.S. Cl.
CPC ..... *F04B 1/16* (2013.01); *B08B 3/026* (2013.01); *F04B 17/03* (2013.01); *F04B 17/06* (2013.01);
(Continued)

(58) Field of Classification Search
CPC .. F04B 19/22; F04B 53/14; F04B 1/16; F04B 53/144; F04B 53/06; F04B 17/06; F04B 17/03; F04C 18/077; B08B 3/026
See application file for complete search history.

(56) References Cited

U.S. PATENT DOCUMENTS 4,162,037 A 7/1979 Koyama
4,792,096 A 12/1988 Gregory
(Continued)

FOREIGN PATENT DOCUMENTS

CN 87212157 U 5/1988
CN 2088612 U 11/1991
(Continued)

OTHER PUBLICATIONS

European Communication pursuant to Rule 114(2), "Third Party Observation against EP 3 379 081 A1 Applicant: Positec Power Tools," Aug. 22, 2019, Munich, pp. 1-75.
(Continued)

*Primary Examiner* — Carlos N Lopez
(74) *Attorney, Agent, or Firm* — Dentons US LLP

(57) ABSTRACT

The present invention relates to a pump unit applied to a high-pressure cleaning machine, including: a water inlet chamber, a water outlet chamber, and a central chamber connected to the water inlet chamber and the water outlet chamber. The pump unit further includes a plunger disposed in the central chamber and an eccentric mechanism connected to the plunger. The eccentric mechanism drives the plunger to perform reciprocating motion in the central chamber.

19 Claims, 16 Drawing Sheets

(51) Int. Cl.

| | |
|---|---|
| ***F04B 17/03*** | (2006.01) |
| ***F04B 17/06*** | (2006.01) |
| ***F04B 19/22*** | (2006.01) |
| ***F04B 53/06*** | (2006.01) |
| ***F04B 53/14*** | (2006.01) |
| ***F04C 18/07*** | (2006.01) |
| ***F04C 18/077*** | (2006.01) |

(52) U.S. Cl.

CPC ..... *F04B 19/22* (2013.01); *F04B 53/06* (2013.01); *F04B 53/14* (2013.01); *F04B 53/144* (2013.01); *F04C 18/07* (2013.01); *F04C 18/077* (2013.01)

(56) References Cited

U.S. PATENT DOCUMENTS

| | | | | | |
|---|---|---|---|---|---|
| 4,851,724 | A | | 7/1989 | Polk et al. | |
| 5,071,069 | A | † | 12/1991 | Stirm | B08B 3/028 239/128 |
| 5,956,792 | A | * | 9/1999 | Gutelius | B08B 1/00 15/22.1 |
| D962,387 | S | * | 8/2022 | Wynalda, Jr. | B05B 5/00 D23/223 |
| 2002/0088216 | A1 | | 7/2002 | Horejsi et al. | |
| 2004/0064907 | A1 | * | 4/2004 | Blaustein | A46B 13/02 15/23 |
| 2005/0284963 | A1 | | 12/2005 | Reedy | |
| 2006/0013709 | A1 | | 1/2006 | Hudson et al. | |
| 2006/0091159 | A1 | | 5/2006 | Shew | |
| 2006/0228230 | A1 | | 10/2006 | Bodzak | |
| 2007/0125878 | A1 | | 6/2007 | Hahn et al. | |
| 2009/0045271 | A1 | | 2/2009 | Alexander et al. | |
| 2010/0237161 | A1 | * | 9/2010 | Sandahi | H02K 33/02 239/4 |
| 2011/0198413 | A1 | | 8/2011 | Thompson et al. | |
| 2013/0105598 | A1 | | 5/2013 | Shultz et al. | |
| 2014/0034754 | A1 | | 2/2014 | Thompson et al. | |
| 2014/0295257 | A1 | | 10/2014 | Harada | |
| 2015/0214520 | A1 | * | 7/2015 | Nishikawa | H01M 50/20 429/100 |
| 2016/0236217 | A1 | | 8/2016 | Jenkins | |
| 2019/0283061 | A1 | * | 9/2019 | Qiao | B08B 3/02 |
| 2020/0121867 | A1 | * | 4/2020 | Wright | B05B 7/2416 |
| 2021/0040940 | A1 | * | 2/2021 | Zhu | B60S 5/046 |

FOREIGN PATENT DOCUMENTS

| | | | | | |
|---|---|---|---|---|---|
| CN | 2233995 | Y | | 8/1996 | |
| CN | 2346952 | Y | | 11/1999 | |
| CN | 2354493 | Y | | 12/1999 | |
| CN | 2407844 | Y | | 11/2000 | |
| CN | 1471442 | A | | 1/2004 | |
| CN | 2611634 | Y | | 4/2004 | |
| CN | 1539558 | A | | 10/2004 | |
| CN | 1840246 | A | | 10/2006 | |
| CN | 200964928 | Y | † | 10/2007 | |
| CN | 200964928 | Y | | 10/2007 | |
| CN | 101100988 | A | | 1/2008 | |
| CN | 200999036 | | | 1/2008 | |
| CN | 101450345 | A | | 6/2009 | |
| CN | 201337997 | Y | † | 11/2009 | |
| CN | 101655080 | A | | 2/2010 | |
| CN | 101664742 | A | | 3/2010 | |
| CN | 201539377 | U | | 8/2010 | |
| CN | 102094806 | A | | 6/2011 | |
| CN | 202152718 | U | | 2/2012 | |
| CN | 202326054 | U | | 7/2012 | |
| CN | 102661383 | A | | 9/2012 | |
| CN | 202690411 | U | | 1/2013 | |
| CN | 202883287 | U | | 4/2013 | |
| CN | 203018253 | U | | 6/2013 | |
| CN | 103272790 | A | | 9/2013 | |
| CN | 203209349 | U | | 9/2013 | |
| CN | 103355135 | A | | 10/2013 | |
| CN | 203515982 | U | | 4/2014 | |
| CN | 103775301 | A | | 5/2014 | |
| CN | 103807127 | A | | 5/2014 | |
| CN | 203584784 | U | | 5/2014 | |
| CN | 203620835 | U | | 6/2014 | |
| CN | 104114294 | A | | 10/2014 | |
| CN | 104114863 | A | † | 10/2014 | |
| CN | 203935940 | U | | 11/2014 | |
| CN | 204113638 | U | | 1/2015 | |
| CN | 104728104 | A | | 6/2015 | |
| CN | 204511797 | U | | 7/2015 | |
| CN | 104858081 | A | | 8/2015 | |
| CN | 205570600 | U | | 9/2016 | |
| CN | 205587190 | U | | 9/2016 | |
| CN | 108212585 | A | * | 6/2018 | B05B 11/3043 |
| CN | 213612122 | U | * | 7/2021 | |
| DE | 10337849 | A1 | | 3/2005 | |
| DE | 102004049630 | A1 | † | 4/2006 | |
| DE | 50 2004 006 939.8 D1 | | | 6/2008 | |
| EP | 0312862 | A2 | | 4/1989 | |
| EP | 0420473 | A1 | | 4/1991 | |
| EP | 0443399 | A2 | | 8/1991 | |
| EP | 0464229 | A1 | | 1/1992 | |
| EP | 0468082 | A1 | | 1/1992 | |
| EP | 0521520 | A1 | | 1/1993 | |
| EP | 0620766 | B1 | | 11/1995 | |
| EP | 0949005 | A1 | | 10/1999 | |
| EP | 1443209 | A2 | | 8/2004 | |
| EP | 1658438 | A1 | | 5/2006 | |
| EP | 2644023 | A1 | | 10/2013 | |
| EP | 2777823 | A1 | | 9/2014 | |
| GB | 2252134 | A | | 7/1992 | |
| GB | 2407848 | A | | 5/2005 | |
| JP | 1-148356 | A | | 6/1989 | |
| JP | 2001-3854 | A | | 1/2001 | |
| JP | 2002-98045 | A | | 4/2002 | |
| JP | 2005-351174 | A | | 12/2005 | |
| JP | 2006515042 | A | | 5/2006 | |
| JP | 4164094 | B2 | | 10/2008 | |
| JP | 2014-37019 | A | | 2/2014 | |
| WO | 91/14081 | A1 | | 9/1991 | |
| WO | 9317274 | A1 | | 9/1993 | |
| WO | 2005/017361 | A1 | | 2/2005 | |
| WO | 2005/099908 | A1 | † | 10/2005 | |
| WO | 2013121782 | | | 8/2013 | |
| WO | 2015/079840 | A1 | | 6/2015 | |

OTHER PUBLICATIONS

Zipper Document/ 3rd Party Observation European Application No. 16865808.6 dated Feb. 9, 2019.

U.S. Appl. No. 15/518,205, filed Jul. 23, 2018, U.S. Pat. No. 10,968,899.

Liao, Kebing and Zhang, Li, Safety Ergonomics, China University of Mining and Technology Press, p. 144, Aug. 31, 2009 (3 pages).

Liu, Chunrong, Ergonomics Application, Shanghai People's Fine Arts Publishing House, p. 95, Jan. 31, 2009 (3 pages).

Uranium Mining Technical Writing Group, Uranium Mining Technology, p. 177, Apr. 30, 1981 (2 pages).

CN1539558A—Machine translation (Year: 2004).*

Pinghua Wu et al. U.S. Appl. 15/518,205, filed Jul. 23, 2018, Pump Unit and Handheld High Pressure Washer.

Operations Manual Z1-DS2V-AKKU dated Jul. 14, 2015, AKKU Gargen Sprayer, 52 pages.

* cited by examiner

† cited by third party

PUMP UNIT AND HANDHELD HIGH PRESSURE WASHER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

Cross-Reference to Related Applications

This *application is a reissue of U.S. Pat. No. 10,968,899, which issued Apr. 6, 2021 from U.S. patent application Ser. No. 15/518,205, filed Jul. 23, 2018, which* is the United States national phase of International Patent Application No. PCT/CN2016/106663, filed Nov. 21, 2016, which claims priority to CN 201510810513.3, filed Nov. 20, 2015, the entire contents of which are expressly incorporated herein by reference.

Field of the Disclosure

The present invention relates to a pump unit. The present invention further relates to a handheld high-pressure cleaning machine, and in particular, to a handheld high-pressure cleaning machine using the pump unit.

Background

In family life and outdoor activities, there are always extensive demands for cleaning.

In courtyard-centered family life, people usually need to clean balconies, aisles, outdoor tables and chairs, barbecues, automobiles, bicycles, garages, pets, garden tools, windows, swimming pools, outdoor stairs, and the like. Those objects are used outdoors. Therefore, it is inevitable for those objects to get stains such as oil, leaves, and dust. It is very inconvenient to clean by using a duster cloth, and those objects need to be cleaned by using water or even high-pressure water. To satisfy the foregoing demands, a solution on the market is to provide domestic high-pressure cleaning machines. As disclosed in the Chinese patent CN1840246A, the high-pressure cleaning machines generally have a main body and a spray gun. The main body is provided with a water tank, a motor, and a water pump. The spray gun is provided with a trigger switch for spraying water. The high-pressure cleaning machines have a large volume and a heavy weight. When a working scenario is changed, transportation of the high-pressure cleaning machines is inconvenient. For example, on a family cleaning day, if windows, lanes, stairs, and automobiles need to be cleaned one by one, a high-pressure cleaning machine needs to be moved among different locations. In addition, water needs to be added to a water tank before the high-pressure cleaning machine is used. Operations are not simple enough.

In outdoor activities, such as mountain climbing, off-road driving, cycling, camping, horse riding, and boat sailing, tools and animals involved in the fierce activities that are carried out in an environment closer to nature get dirty more easily and need to be cleaned in time. For example, automobiles, motorcycles, and bicycles inevitably get mud after being used in the wild. Ships, boats, and rafts are covered with mud and water plants, and also need to be cleaned after sailing. Horses and users sweat and get dirty, and should be washed or take a shower in time in case of uncomfortableness. The foregoing high-pressure cleaning machine is not suitable to be carried around in the foregoing outdoor activities due to a large volume and a heavy weight. The foregoing high-pressure cleaning machine is powered by using an alternating-current power source. A matching power source is difficult to find in the outdoor activities. Users have no choice but to tolerate stains in the activities, and clean after they return to a fixed location after the activities end; or the users simply wipe with a duster cloth when passing by a water source during the activities. Cleaning efficiency is low, an effect is poor, and it is very dirty in a cleaning process.

In conclusion, users have a cleaning demand in various scenarios and locations. However, related products on the market have poor portability, and can only be used in limited scenarios and locations. The users cannot clean anytime anywhere. If a product that can be conveniently and effortlessly moved to clean a balcony, a lane, an automobile, and the like in various family cleaning activities and can be carried around in activities such as off-road driving and cycling to satisfy a cleaning demand in outdoor activities while satisfying a domestic cleaning demand of the users can be provided, cleaning work of the users will be greatly simplified, and a location range of the cleaning work will be expanded, thereby improving life quality of the users.

A main reason affecting a portable function of a high-pressure cleaning machine is mainly that a pump in the high-pressure cleaning machine has a relatively large volume and a relatively heavy weight. A common structure of the pump is shown in the Chinese patent CN1212899C. The pump is driven to work by using a piston and an oscillating wheel-disk. The oscillating wheel-disk and the piston need a relatively large quantity of working cavities. Therefore, this type of pump has a relatively complex structure, a relatively heavy weight, and a relatively large volume.

A main reason affecting an outdoor use function of a high-pressure cleaning machine is that the high-pressure cleaning machine uses an alternating-current power source. The high-pressure cleaning machine that is powered by using an alternating current is limited by a power supply, and a use scenario needs to be provided with a corresponding alternating-current power source, thereby reducing convenience of application in an outdoor scenario. The high-pressure cleaning machine that is powered by using an alternating current is limited by a length of a power line, and a cleaning range thereof is only within a range of the length of the power line, thereby restricting the cleaning range and mobility of the high-pressure cleaning machine.

SUMMARY

In view of this, one objective of the present invention is to provide a pump unit having a simple structure and a small volume and a high-pressure cleaning machine using this type of pump unit.

To achieve the foregoing objective, technical solutions used in the present invention are as follows: a pump unit applied to a high-pressure cleaning machine, comprising: a water inlet chamber; a water outlet chamber; and a central chamber, connected to the water inlet chamber and the water outlet chamber, wherein the pump unit further comprises a plunger disposed in the central chamber and an eccentric mechanism connected to the plunger, and the eccentric mechanism drives the plunger to perform reciprocating motion in the central chamber.

Preferably, wherein a first one-way valve unit used for conduction and separation is disposed between the water outlet chamber and the central chamber, a second one-way valve unit used for conduction and separation is disposed between the water inlet chamber and the central chamber, and the first one-way valve unit and the second one-way valve unit are driven by the plunger to be correspondingly opened or closed.

Preferably, wherein the eccentric mechanism comprises a rotating shaft rotating around a central axis, and an eccentric shaft eccentrically connected to the rotating shaft, and the eccentric shaft is connected to the plunger, so that the plunger performs eccentric reciprocating motion relative to the center of the rotating shaft.

Preferably, wherein the center of the plunger is provided with a mounting portion connected to the eccentric shaft, and a mounting bearing is disposed between the mounting portion and the eccentric shaft.

Preferably, wherein a gap is formed between an inner wall of the central chamber and the plunger, and the gap performs linear reciprocating motion with motion of the plunger.

To achieve the foregoing objective, technical solutions used in the present invention are as follows: a pump unit applied to a high-pressure cleaning machine, comprising: a water inlet chamber; a water outlet chamber; and a central chamber, connected to the water inlet chamber and the water outlet chamber, wherein the pump unit further comprises a plunger disposed in the central chamber and a crank-link mechanism connected to the plunger, and the crank-link mechanism drives the plunger to perform reciprocating motion in the central chamber.

Preferably, wherein the crank-link mechanism comprises a connecting rod with one end connected to the plunger and a crank that is moveably connected to the other end of the connecting rod, and the connecting rod may be rotationally connected relatively to the crank.

To achieve the foregoing objective, technical solutions used in the present invention are as follows: a pump unit applied to a high-pressure cleaning machine, comprising: a casing, and a water inlet chamber and a water outlet chamber that are separately disposed, wherein gears having a separation function are disposed between the water inlet chamber and the water outlet chamber, the gears rotate around respective axes, delivery chambers are formed by gaps between latches of the gears, and the delivery chambers deliver water in the water inlet chamber to the water outlet chamber.

Preferably, wherein the gears comprise a driving gear and a driven gear, the driving gear and the driven gear are engaged with each other, and the driving gear is driven to rotate around an axis.

Preferably, wherein the high-pressure cleaning machine comprises: a motor configured to generate power and a transmission mechanism connected to the motor and the pump unit, wherein the transmission mechanism has a reduction box casing, and the reduction box casing and a casing of the pump unit are integrally formed.

In view of this, one objective of the present invention is to provide a high-pressure cleaning machine that has a proper weight and that is suitable for handholding and easy to move.

To achieve the foregoing objective, technical solutions used in the present invention are as follows: A handheld high-pressure cleaning machine, wherein the high-pressure cleaning machine is powered by using a direct current, and can be connected to an external water source by using a water pipe; and the high-pressure cleaning machine comprises: a housing, wherein a motor, a transmission mechanism connected to the motor, and a pump driven by the transmission mechanism are provided in the housing; a handle used for gripping; and a nozzle, wherein water from the external water source is sprayed out through the nozzle.

Preferably, wherein the pump is described according to any one of claims 1 to 9.

Preferably, wherein the high-pressure cleaning machine has a total weight less than or equal to 3 kilograms.

Preferably, wherein the high-pressure cleaning machine has a total weight less than or equal to 2 kilograms.

Preferably, wherein the center of gravity of the high-pressure cleaning machine is located in a front to rear direction of the high-pressure cleaning machine and is within a range from 8 centimeters behind a rear endpoint of the handle to 8 centimeters in front of a front endpoint of the handle.

Preferably, wherein the center of gravity of the high-pressure cleaning machine is located in the front to rear direction of the high-pressure cleaning machine and is within a range from the rear endpoint of the handle to 5 centimeters in front of the front endpoint of the handle.

Preferably, wherein the motor, the transmission mechanism, and the pump form a functional component, and the functional component is located at one end of the handle; and the high-pressure cleaning machine further comprises a battery pack, and the battery pack is located at the other end of the handle.

Preferably, wherein the motor, the transmission mechanism, and the pump form a functional component, and the center of gravity of the functional component is located in front of the front endpoint of the handle; and the high-pressure cleaning machine further comprises a battery pack, and the center of gravity of the battery pack is located behind the front endpoint of the handle.

Preferably, wherein at least one part of the functional component and the battery pack extends into the handle.

Preferably, wherein the motor, the transmission mechanism, and the pump form a functional component, and the functional component has a weight less than or equal to 1000 grams; and the high-pressure cleaning machine further comprises a battery pack, and the battery pack has a weight less than or equal to 800 grams.

Preferably, wherein the high-pressure cleaning machine further comprises a battery pack, a rated voltage of the battery pack is from 18 V to 42 V, and a capacity is from 1.5 Ah to 3 Ah.

Preferably, wherein the high-pressure cleaning machine has a water inlet port configured to connect to the water pipe, wherein the water inlet port is within a range of 5 centimeters in front of or behind the center of gravity of the high-pressure cleaning machine.

Preferably, having a water inlet port configured to connect to the water pipe, wherein the water inlet port is within a range from 5 centimeters in front of a front endpoint of the handle to 5 centimeters behind a rear endpoint of the handle.

Preferably, wherein the high-pressure cleaning machine has a total length less than 500 millimeters, and has a height less than or equal to 250 millimeters.

Preferably, wherein the transmission mechanism comprises a reduction structure, a no-load speed of the motor is greater than or equal to 10000 rpm, and an output speed of the reduction structure is less than or equal to 3000 rpm.

Preferably, wherein the no-load speed of the motor is greater than or equal to 15000 rpm, and the output speed of the reduction structure is less than or equal to 2500 rpm.

Preferably, wherein the reduction structure is a planetary gear structure.

Preferably, wherein a reduction ratio of the reduction structure is from 12:1 to 3:1 or from 10:1 to 4:1.

To achieve the foregoing objective, technical solutions used in the present invention are as follows: a handheld high-pressure cleaning machine, wherein the high-pressure cleaning machine can be connected to an external water source by using a water pipe, and the high-pressure cleaning machine comprises: a housing, wherein a motor, a transmission mechanism connected to the motor, and a pump driven by the transmission mechanism are provided in the housing; a handle used for gripping; and a nozzle, wherein water from the external water source is sprayed out through the nozzle, wherein the center of gravity of the high-pressure cleaning machine is located in a front to rear direction of the high-pressure cleaning machine and is within a range from 8 centimeters behind a rear endpoint of the handle to 8 centimeters in front of a front endpoint of the handle.

Preferably, wherein the center of gravity of the high-pressure cleaning machine is located in the front to rear direction of the high-pressure cleaning machine and is within a range from the rear endpoint of the handle to 5 centimeters in front of the front endpoint of the handle.

Preferably, wherein the motor, the transmission mechanism, and the pump form a functional component, and the functional component is located at one end of the handle; and the high-pressure cleaning machine further comprises a battery pack, and the battery pack is located at the other end of the handle.

Preferably, wherein the motor, the transmission mechanism, and the pump form a functional component, and the functional component has a weight less than or equal to 1000 grams; and the high-pressure cleaning machine further comprises a battery pack, and the battery pack has a weight less than or equal to 800 grams.

Preferably, wherein the high-pressure cleaning machine has a total weight less than or equal to 3 kilograms.

Preferably, wherein the pump is described according to any one of claims 1 to 9.

To achieve the foregoing objective, technical solutions used in the present invention are as follows: a handheld high-pressure cleaning machine, wherein the high-pressure cleaning machine can be connected to an external water source by using a water pipe, and the high-pressure cleaning machine comprises: a housing, wherein a motor, a transmission mechanism connected to the motor, and a pump driven by the transmission mechanism are provided in the housing; a handle used for gripping; and a nozzle, wherein water from the external water source is sprayed out through the nozzle, wherein the transmission mechanism comprises a reduction structure, a no-load speed of the motor is greater than or equal to 10000 rpm, and an output speed of the reduction structure is less than or equal to 3000 rpm.

Preferably, wherein the no-load speed of the motor is greater than or equal to 15000 rpm, and the output speed of the reduction structure is less than or equal to 2500 rpm.

Preferably, wherein the reduction structure is a planetary gear structure.

Preferably, wherein a reduction ratio of the reduction structure is from 12:1 to 3:1 or from 10:1 to 4:1.

Preferably, wherein the pump is described according to any one of claims 1 to 9.

To achieve the foregoing objective, technical solutions used in the present invention are as follows: A handheld high-pressure cleaning machine, wherein the high-pressure cleaning machine can be connected to an external water source by using a water pipe, and the high-pressure cleaning machine comprises: a housing, wherein a motor, a transmission mechanism connected to the motor, and a pump driven by the transmission mechanism are provided in the housing; a handle used for gripping; and a nozzle, wherein water from the external water source is sprayed out through the nozzle, wherein the transmission mechanism comprises a reduction structure, the reduction structure is a planetary gear reduction structure, and the planetary gear reduction structure reduces an output speed of the motor and increases output torque of the motor.

Compared with the prior art, a beneficial effect of the present invention is as follows: The plunger in the pump applied to the high-pressure cleaning machine is driven by the eccentric mechanism or the crank-link mechanism to perform reciprocating motion in a chamber so as to perform high-pressure water pumping. Therefore, a structure of the pump is relatively simple, and there is only one plunger, so that power consumption is reduced compared with a multi-plunger structure. In addition, a volume of the high-pressure cleaning machine using this type of pump is relatively small.

Compared with the prior art, a beneficial effect of the present invention is as follows: Locations of the pump, the transmission mechanism, the motor, and the battery pack are properly arranged, so that the center of gravity of the high-pressure cleaning machine is located in the front to rear direction of the high-pressure cleaning machine and is within the range from 8 centimeters behind the rear endpoint of the handle to 8 centimeters in front of the front endpoint of the handle, thereby effectively improving handholding comfort of the high-pressure cleaning machine.

Compared with the prior art, a beneficial effect of the present invention is as follows: The output speed of the motor is transferred to the pump after being reduced by the transmission mechanism, thereby effectively balancing a speed range required by the pump and a weight of the motor, and further reducing the total weight of the high-pressure cleaning machine. Preferably, the transmission mechanism uses the planetary gear reduction structure. The planetary gear reduction structure can not only effectively reduce the output speed of the motor and improve the output torque of the motor, but also have characteristics of a small volume and a light weight, thereby further improving handholding comfort of the high-pressure cleaning machine.

Compared with the prior art, a beneficial effect of the present invention is as follows: The high-pressure cleaning machine uses a direct-current battery pack for power supplying, and can be connected to the external water source by using the water pipe, thereby effectively improving portability of the high-pressure cleaning machine, and expanding use scenarios of the high-pressure cleaning machine. A user can use the high-pressure cleaning machine for cleaning work in any scenario with a water source.

BRIEF DESCRIPTION OF THE DRAWINGS

The objectives, the technical solutions, and the beneficial effects of the present invention that are described above can be clearly obtained with reference to descriptions of the accompanying drawings and by using detailed descriptions of the following specific embodiments that can implement the present invention.

Same numerals and symbols in the accompanying drawings and the specification are used to represent same or equivalent elements.

DETAILED DESCRIPTION

Preferred embodiments of the present invention are described below in detail with reference to the accompanying drawings to make a person skilled in the art easily understand advantages and features of the present invention. Therefore, the protection scope of the present invention is more clearly defined.

Figure 1:
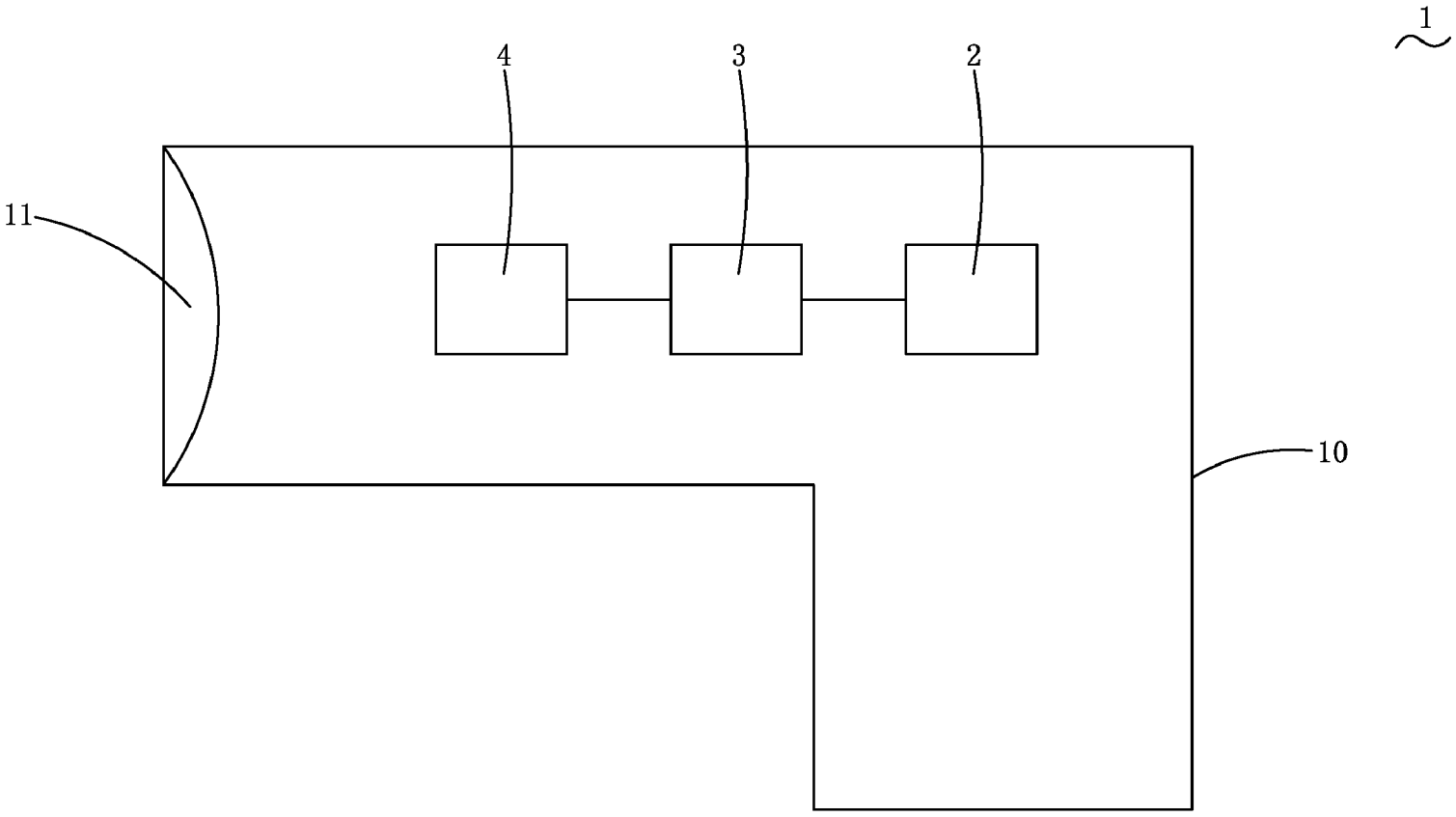
FIG. 1 is a schematic diagram of a high-pressure cleaning machine according to an embodiment of the present invention.

As shown in FIG. 1, FIG. 1 is a schematic diagram of a high-pressure cleaning machine 1 according to an embodiment of the present invention. The high-pressure cleaning machine 1 is handheld and has a handle used for holding. The high-pressure cleaning machine 1 has a housing 10. A motor 2, a transmission mechanism 3 connected to the motor 2, and a pump 4 driven by the transmission mechanism 3 are provided in the housing 10. The high-pressure cleaning machine 1 may be powered by using an alternating current or a direct current. To satisfy a requirement of handholding and portability, the high-pressure cleaning machine 1 does not have a water tank configured to store water, but instead, is connected to an external water source by using a water pipe. The external water source may be a pond, a water tap, or the like. The high-pressure cleaning machine 1 further has a nozzle 11. The water in the external water source is sprayed out through the nozzle 11 after being pressurized by the pump. This type of handheld high-pressure cleaning machine has a small volume and a light weight, and is easy to operate.

Figure 2:
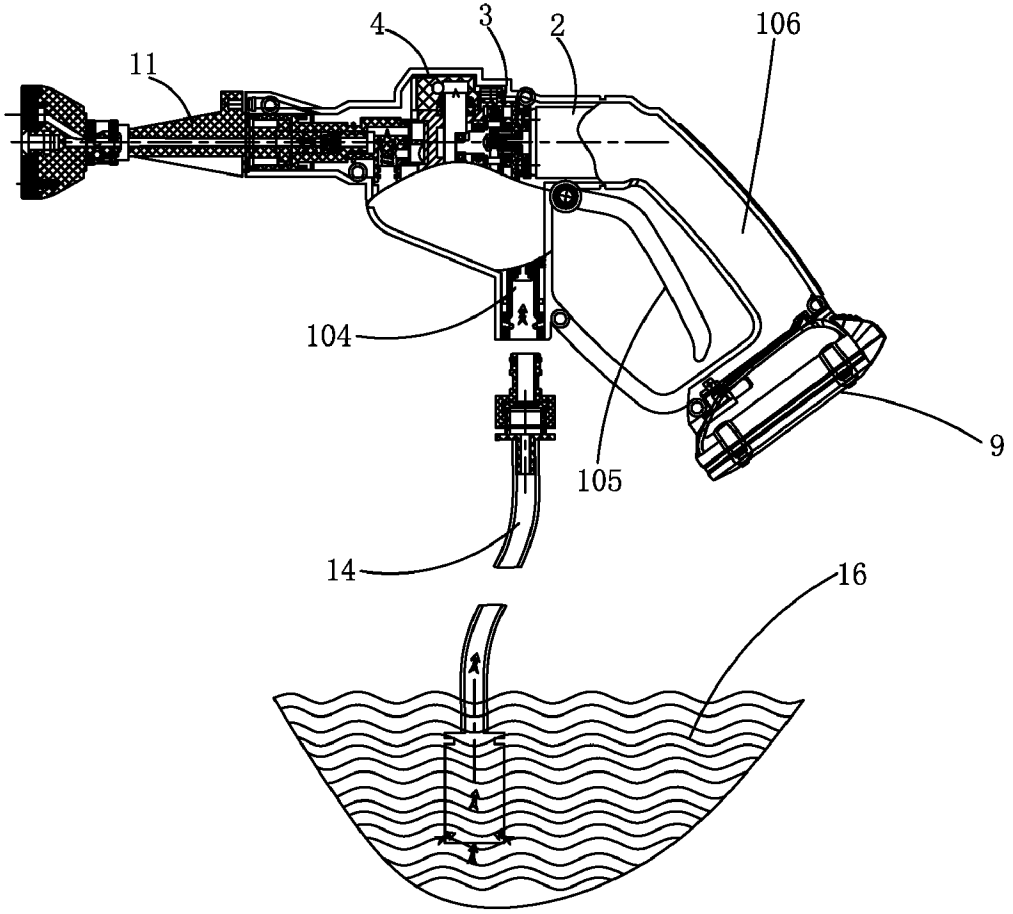
FIG. 2 is a specific structural diagram of the high-pressure cleaning machine shown in FIG. 1.

As shown in FIG. 2, FIG. 2 is a specific structural diagram of the high-pressure cleaning machine 1 shown in FIG. 1. In this embodiment, the left side of FIG. 2 is defined as the front direction, and the right side of FIG. 2 is defined as the rear.

The high-pressure cleaning machine is a handheld high-pressure cleaning machine powered by using a direct current. The high-pressure cleaning machine 1 is an integrated spray gun, including a handle 106 used for holding, a battery pack 9, the motor 2, the transmission mechanism 3 connected to the motor 2, the pump 4 driven by the transmission mechanism 3, the nozzle 11 connected to a water outlet of the pump 4, and a water inlet port 104 connected to a water inlet of the pump 4. The high-pressure cleaning machine 1 further includes the housing 10 accommodating the motor 2, the pump 4, and the transmission mechanism 3. The handle 106 is formed on or is connected to the housing 10. A trigger component 105 is disposed near the handle 106, is specifically a trigger, and is configured to trigger a spraying action. The pump, the transmission mechanism, and the motor form a functional component of the high-pressure cleaning machine.

Referring to FIG. 2, as described above, the high-pressure cleaning machine 1 does not include a water tank, but instead, is connected to a water pipe 14 at the water inlet port 104, and then is connected to an external water source 16 by using the water pipe 14. In this way, after the water inlet port 104 is connected to the water pipe 14, in a family activity, a user can hold the high-pressure cleaning machine and freely move in a length range of the water pipe to do spraying and cleaning work only by connecting a tail end of the water pipe to a water tap or putting the tail end into an external water source such as a swimming pool, a pond, or a bucket. In an outdoor activity, a user can do spraying and cleaning work only by stopping at a place with water, and putting the tail end of the water pipe into an external water source at any time. The pump can suck water in the external water source into the high-pressure cleaning machine, and then directly spray the water out of the high-pressure cleaning machine.

To be carried around and used to clean various articles, the high-pressure cleaning machine 1 needs to have a light weight and a high cleaning capability. However, the two are contradictory. To implement a light weight of the high-pressure cleaning machine, weights of the battery pack 9 and the functional component need to be reduced as much as possible. However, a light weight of the battery pack 9 shortens a working time of the high-pressure cleaning machine, and a light weight of the functional component lowers cleaning efficiency of the high-pressure cleaning machine. As a result, a cleaning capability is reduced. Moreover, the working time and the cleaning efficiency are mutually restricted. For a same battery pack, a longer working time indicates a weaker cleaning capability. On the contrary, a stronger cleaning capability indicates a shorter working time. Therefore, in this embodiment, the weight, the working time, and the cleaning efficiency of the high-pressure cleaning machine need to be balanced.

In this embodiment, the high-pressure cleaning machine 1 has a total weight less than or equal to 3 kilograms. In an optional implementation solution, the total weight is less than 2.8 kilograms, 2.5 kilograms, 2 kilograms, 1.8 kilograms, 1.7 kilograms, or 1.5 kilograms. In an embodiment, the functional component has a weight less than or equal to 1000 grams, and the battery pack 9 has a weight less than or equal to 800 grams. In another optional embodiment, the functional component has a weight less than or equal to 600 grams, and the battery pack 9 has a weight less than or equal to 400 grams. In an embodiment, another component except the functional component and the battery pack 9 has a weight less than or equal to 500 grams. Preferably, the another component has a weight less than 400 grams or 300 grams. A lighter weight enables that the high-pressure cleaning machine 1 to be handheld to do cleaning work for a long time. In this embodiment, the battery pack 9 is a lithium battery pack of a rated voltage of 18 V to 42 V and of 1.5 Ah to 3 Ah, to provide enough working energy and be light. In another optional embodiment, the rated voltage of the battery pack may also be from 28 V to 60 V. In an embodiment, the battery pack 9 is a detachable rechargeable battery pack. The battery pack may be at least adaptively connected to two different types of direct-current tools, so that different direct-current tools can share the battery pack, so as to reduce types and a quantity of battery packs required by a user The motor 2, the transmission mechanism 3, and the pump 4 are described in detail below. A specific structure thereof has both a light weight and a cleaning capability.

In addition to the weight, a location of the center of gravity also affects actual weight experience of a user. In this embodiment, the pump 4, the transmission mechanism 3, and the motor 2 in the functional component are sequentially arranged from front-to-rear direction, and are located at one end of the handle 106. The battery pack 9 is located at the other end of the handle 106, so that the center of gravity of the functional component is located in the front of a front endpoint of the handle, and the center of gravity of the battery pack is located behind the front endpoint of the handle. In an optional implementation solution, at least one part of the functional component and the battery pack 9 that are respectively located at the two ends of the handle 106 extends into the handle 106. In an optional implementation solution, all or some of the pump 4, the transmission mechanism 3, and the motor 2 in the functional component are disposed in parallel to the handle 106. For example, the pump 4 is located at one end the handle 106, and the transmission mechanism 3 and the motor 2 are disposed in parallel to the handle 106.

The functional component and the battery pack 9 are two main weight bodies of the high-pressure cleaning machine 1. The functional component and the battery pack 9 are respectively arranged at the two ends of the handle 106, so that the center of gravity of the high-pressure cleaning machine 1 is located near the handle 106. Therefore, when a user holds the high-pressure cleaning machine, the weight basically falls onto a hand of the user. It is relatively labor-saving. Specifically, the center of gravity of the high-pressure cleaning machine 1 falls in a front-to-rear direction of the high-pressure cleaning machine and is within a range from 8 centimeters behind a rear endpoint of the handle 106 to 8 centimeters in front of a front endpoint of the handle 106. In an optional embodiment, the center of gravity falls in the front-to-rear direction of the high-pressure cleaning machine 1 and is within a range from the rear endpoint of the handle 106 to 5 centimeters, 3 centimeters, 2 centimeters, or 1 centimeter in front of the front endpoint of the handle 106. In another optional embodiment, the center of gravity falls in the front-to-rear direction of the high-pressure cleaning machine 1 and is within a range from 5 centimeters, 3 centimeters, 2 centimeters, or 1 centimeter behind the rear endpoint of the handle 106 to the front endpoint of the handle 106. In another optional embodiment, the center of gravity falls in the front-to-rear direction of the high-pressure cleaning machine 1 and is within a range from the rear endpoint of the handle 106 to the front endpoint of the handle.

In this embodiment, the handle 106 is obliquely arranged. In another optional embodiment, the handle 106 is basically vertically arranged. In this embodiment, the handle 106 is located at the tail of an entire machine. In another optional embodiment, the handle 106 may be located in the middle of the entire machine.

In this embodiment, the water inlet port 104 is located near the center of gravity, and specifically, is located within a range of 5 centimeters or 3 centimeters in front of or behind the center of gravity. In this way, a weight of the water pipe 14 connected to the water inlet port also falls near the center of gravity. The water inlet port 104 may also be located near the handle 106, and specifically, is within a range from 3 centimeters or 5 centimeters in front of the front endpoint of the handle 106 to 3 centimeters or 5 centimeters behind the rear endpoint. In this way, a probability that the water pipe 14 intertwines with another object when a user moves is reduced.

To improve portability, in this embodiment, the high-pressure cleaning machine 1 has a total length less than 500 millimeters. Preferably, the total length is 400 millimeters or 350 millimeters. When nozzles of different lengths are used, the total length of the high-pressure cleaning machine is changed. For example, when a long nozzle is used, the total length of the high-pressure cleaning machine may reach 1000 millimeters. Preferably, when no nozzle is added to the high-pressure cleaning machine 1, the length of the high-pressure cleaning machine 1 is less than 300 millimeters or 250 millimeters. The high-pressure cleaning machine 1 has a total height less than 250 millimeters or 200 millimeters, and a total width (not including the battery pack) less than 150 millimeters or 100 millimeters.

Figure 3:
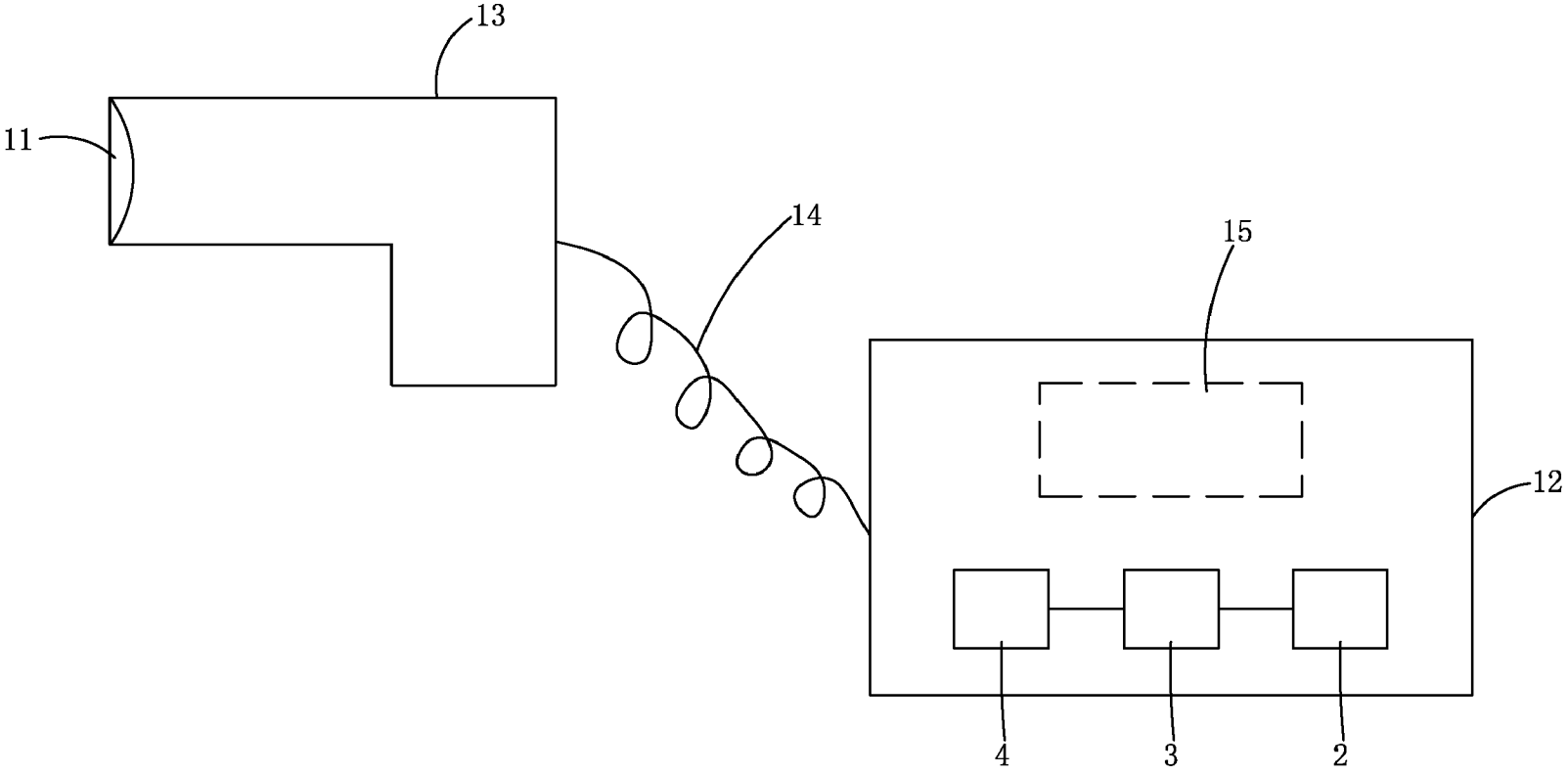
FIG. 3 is a schematic diagram of a high-pressure cleaning machine according to another embodiment of the present invention.

FIG. 3 shows a high-pressure cleaning machine 1 according to another embodiment of the present invention. The high-pressure cleaning machine 1 has a main body 12 and a spray gun 13 that are separately disposed. The spray gun 13 is used for a handholding operation. The spray gun 13 is provided with a nozzle 11. The spray gun 13 is connected to the main body 12 by using a water pipe 14. A motor 2, a transmission mechanism 3, and a pump 4 are disposed in the main body 12. In a preferred embodiment, the main body 12 further includes a water tank 15. The water tank 15 can store some water. In this way, the high-pressure cleaning machine 1 can work in a place far away from a water source. Water in the water tank 15 is delivered to the spray gun 13 through the water pipe 14 after being pressurized by the pump 4. A user controls the spray gun 13 to point to a to-be-cleaned object to clean.

Figure 4:
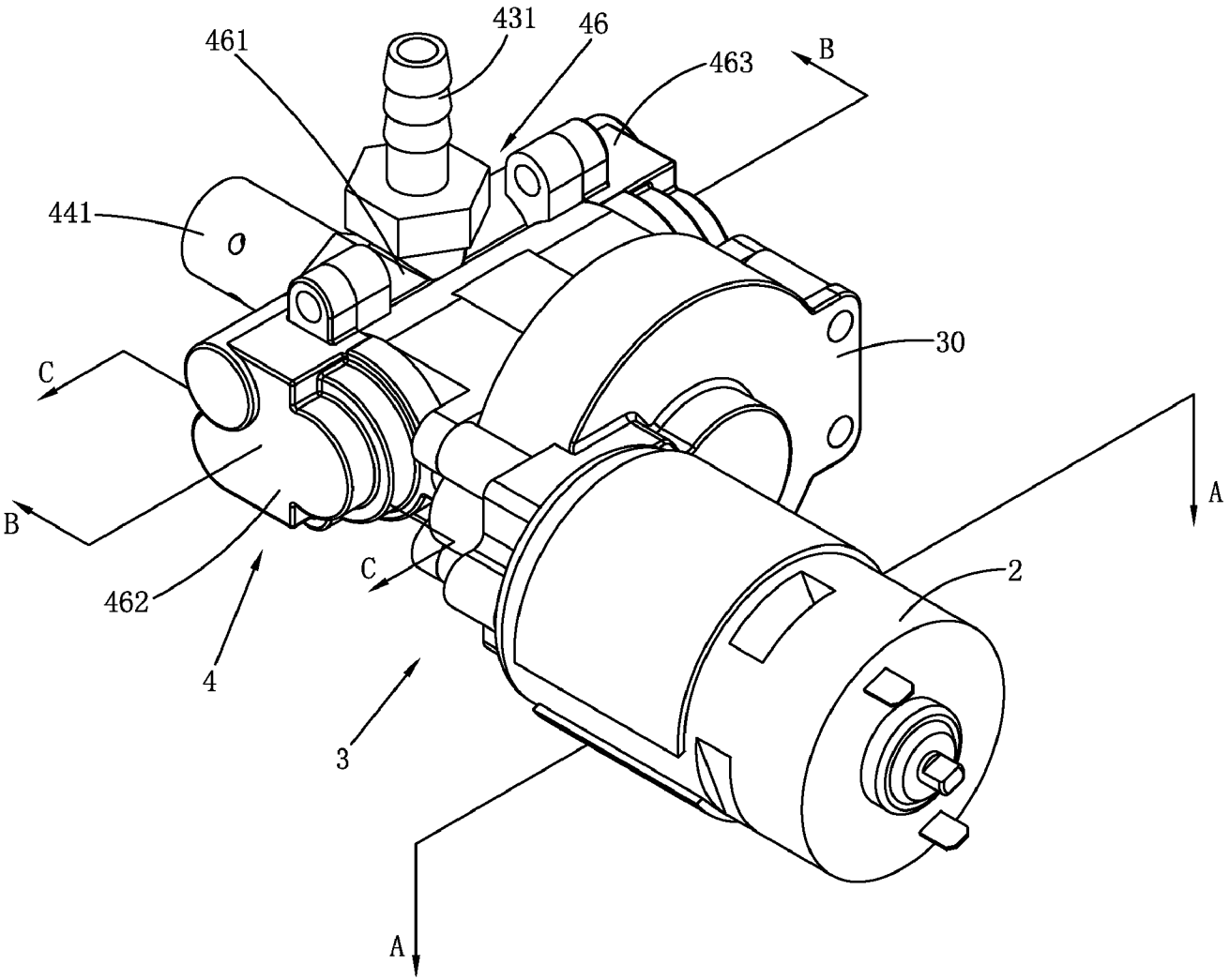
FIG. 4 is an overall schematic diagram of a pump, a transmission mechanism, and a motor according to an embodiment of the present invention.
Figure 5:
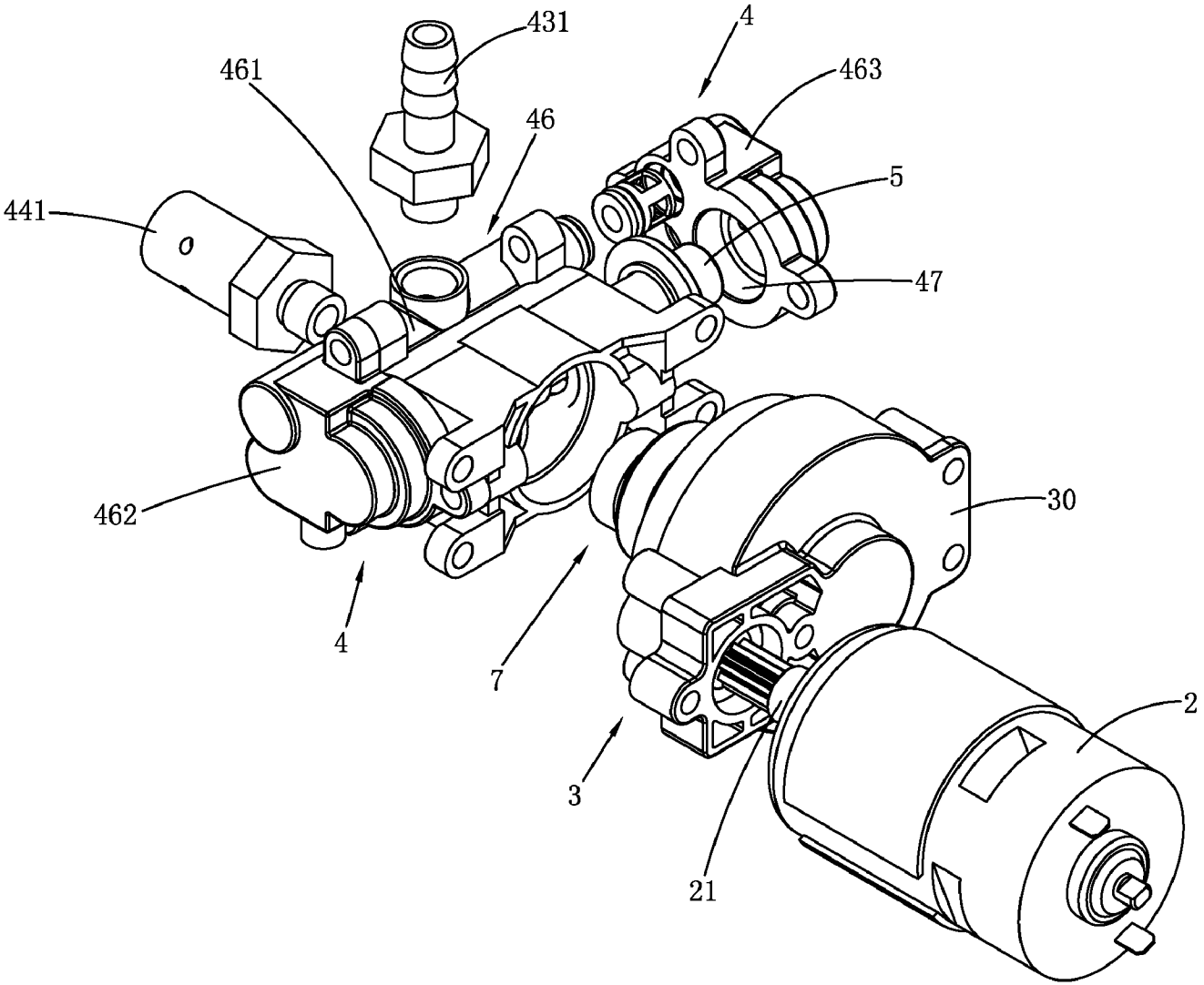
FIG. 5 is an exploded schematic diagram of the pump, the transmission mechanism, and the motor in FIG. 4.

The high-pressure cleaning machines 1 in the foregoing different embodiments all have the pump 4, the motor 2, and the transmission mechanism 3 connected the motor 2 and the pump 4, as shown in FIG. 4, and FIG. 5. The motor 2 is a common AC motor or DC motor. The motor 2 has a motor shaft 21 rotating around an axis of the motor. The motor shaft 21 outputs rotational power to the exterior. To ensure air-tightness, the transmission mechanism 3 generally has a transmission housing 30 externally wrapping the transmission mechanism 3. The transmission housing 30 has two openings. One opening enables the transmission mechanism 3 to connect to the motor 2. The other opening enables the transmission mechanism 3 to connect to the pump 4. The pump 4 is driven by the motor 2 by using the transmission mechanism 3 to increase water pressure of water entering the pump 4, thereby improving a cleaning effect of water.

As shown in FIG. 4, the pump 4 has a housing 46 wrapping a periphery of the pump. The housing 46 has a sealed casing, and a water inlet 431, a water outlet 441, and a connection port connected to the transmission mechanism 3 are on a surface of the housing 46. The water inlet 431 is configured to connect to an external water source, a water pipe, or a water gun. Water enters the pump 4 from the water inlet 431. Preferably, there is one water inlet 431. After being pressurized in the pump 4, water is discharged from the water outlet 441. The water outlet 441 is generally connected to the nozzle 11 of the high-pressure cleaning machine 1. In this way, the nozzle 11 may spray pressurized water out. To avoid mutual interference of water inlet and outlet, generally, the water inlet 431 and the water outlet 441 are separately disposed. Preferably, there is one water outlet 441. For convenience of assembly, the housing 46 includes a pump body 461 and an upper pump cover 462 and a lower pump cover 463 that are detachably installed on the pump body 461. The upper pump cover 462 and the lower pump cover 463 are symmetrically installed at two sides of the pump body 461. The upper pump cover and the lower pump cover are fixedly connected to the pump body 461 in a common fixing manner, for example, by using bolts. The water inlet 431 and the water outlet 441 are both installed on the pump body 461, and opening directions of the water outlet 431 and the water inlet 441 are mutually perpendicular. Certainly, in another implementation manner, the housing 46 may be integrally formed or may be formed by assembling multiple parts familiar to a person skilled in the art.

A specific structure of the pump in this embodiment is described in detail below.

Figure 6:
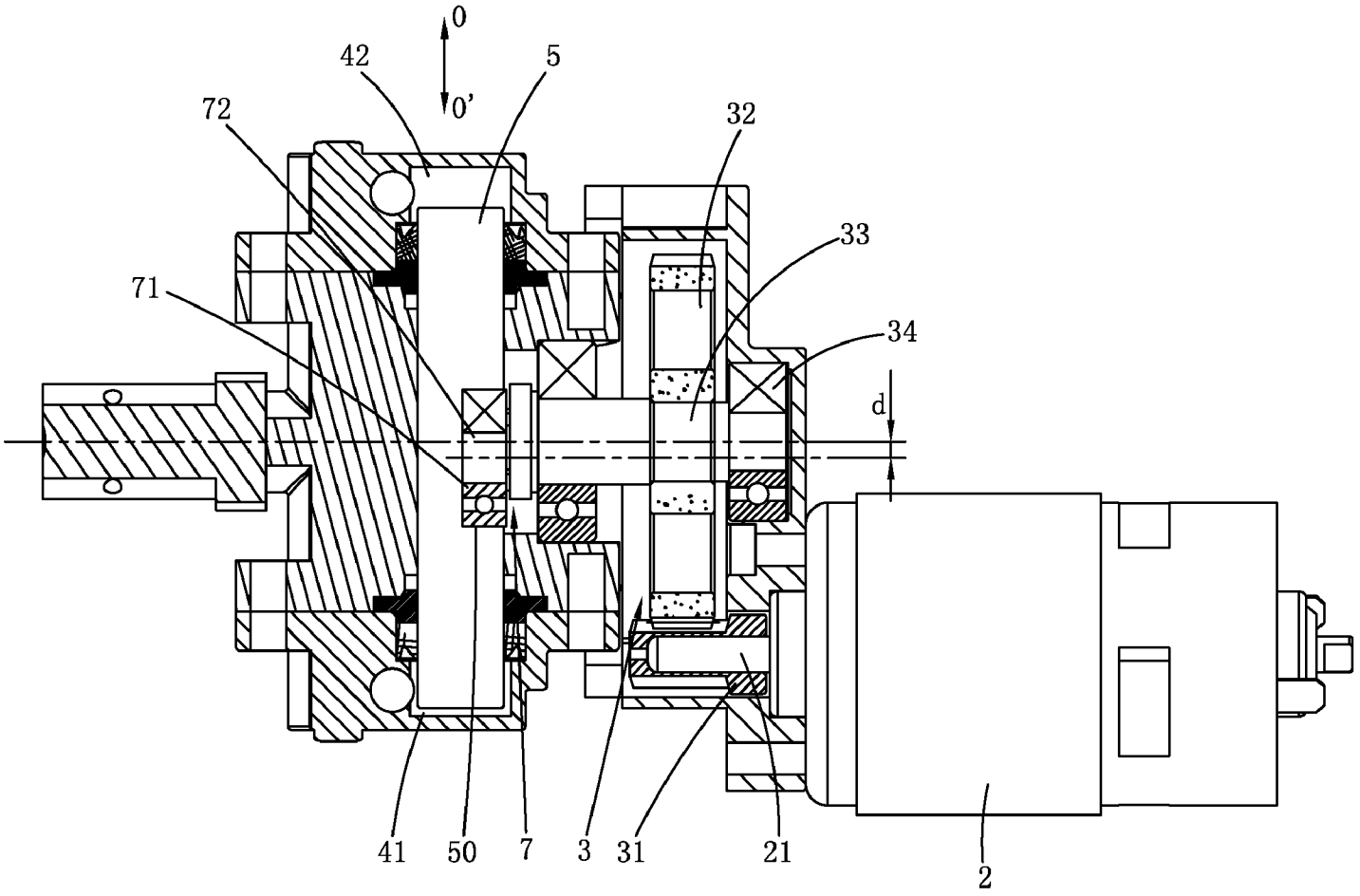
FIG. 6 a cross-sectional view of the pump in FIG. 4 along a section line AA, where a plunger is in a first critical state.

As shown in FIG. 5 and FIG. 6, in the housing 46, the pump 4 has a plunger 5. The plunger 5 is configured to pressurize water. The plunger 5 is a cylinder extending along a length direction. As can be seen with reference to FIG. 5 and FIG. 6, an extension direction of a length of the plunger 5 is separately perpendicular to an opening direction of the water inlet 431 and an opening direction of the water outlet 441. The plunger 5 may be driven to perform reciprocating motion along the length direction of the plunger 5. In this embodiment of the present invention, the plunger 5 is installed and connected to an eccentric mechanism 7. One the one hand, the eccentric mechanism 7 is connected to the plunger 5, and on the other hand, the eccentric mechanism 7 is fixedly connected to the transmission mechanism 3. Therefore, the plunger 5 is driven by the motor 2 and the transmission mechanism 3 by using the eccentric mechanism 7, and actually performs eccentric reciprocating motion. The center of the eccentric reciprocating motion is a rotation center of the transmission mechanism 3, and a direction of the rotation center is perpendicular to the extension direction of the length of the plunger 5. Therefore, from the angle of the extension direction of the length of the plunger 5, that is, a direction of an arrow OO' shown in FIG. 6, the plunger 5 is driven by the motor 2 and the transmission mechanism 3 to perform linear reciprocating motion.

Figure 7:
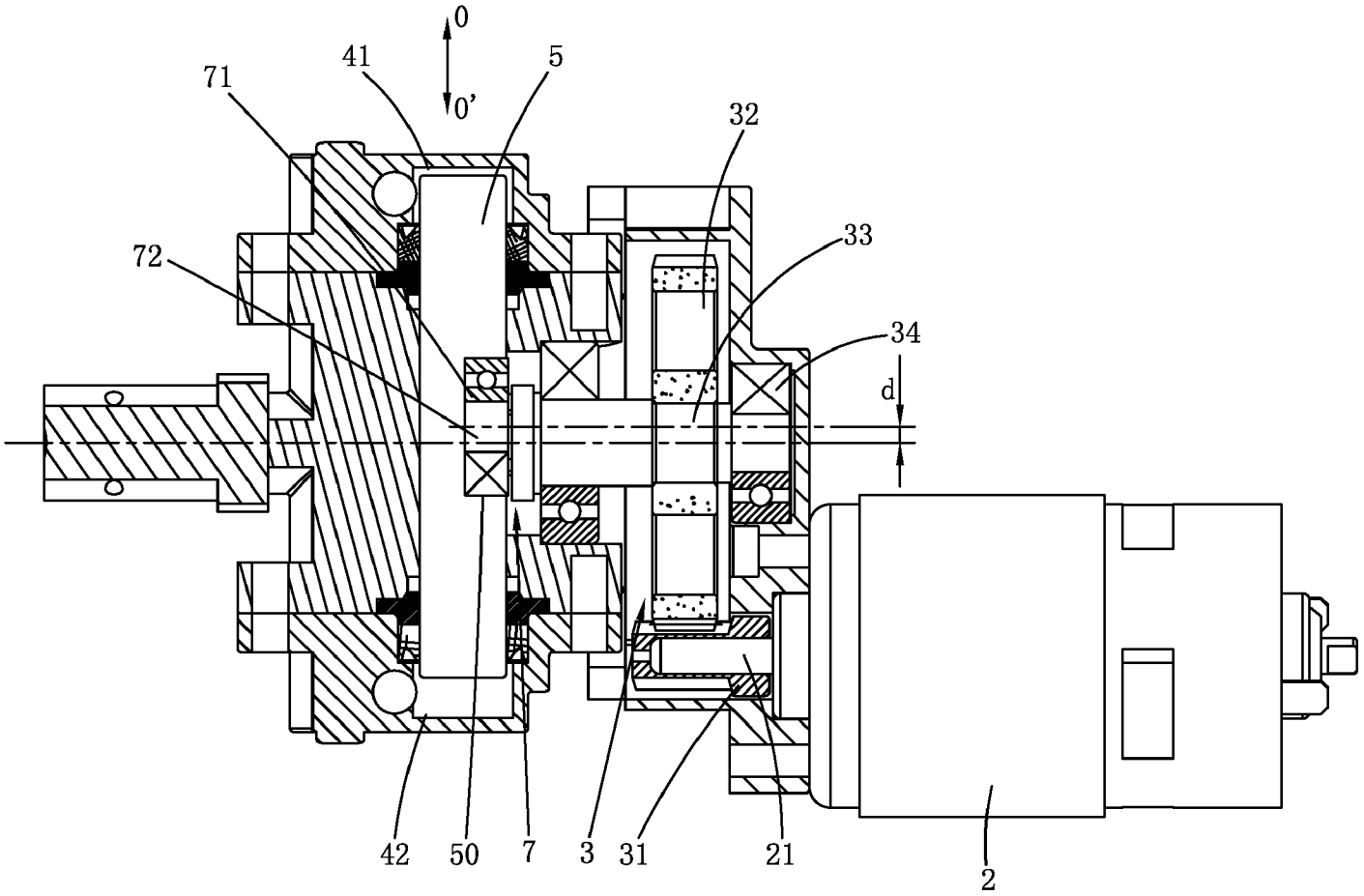
FIG. 7 a cross-sectional view of the pump in FIG. 4 along a section line AA, where a plunger is in a second critical state.

As shown in FIG. 6, there is a central chamber 41 in the pump 4. The central chamber 41 is hollow. The plunger 5 is preferably accommodated in the central chamber 41. The central chamber 41 extends along the length direction of the plunger 5. A size of the central chamber 41 along the length direction of the plunger 5 is greater than the length of the plunger 5, so that when the plunger 5 performs reciprocating motion in the direction, the central chamber 41 always has a cavity 42. As shown in FIG. 6, when the plunger 5 moves to a lower end of the central chamber 41, the cavity 42 is located at an upper end of the central chamber 41. As shown in FIG. 7, when the plunger 5 moves to the upper end of the central chamber 41, the cavity 42 is located at the lower end of the central chamber 41.

Figure 8:
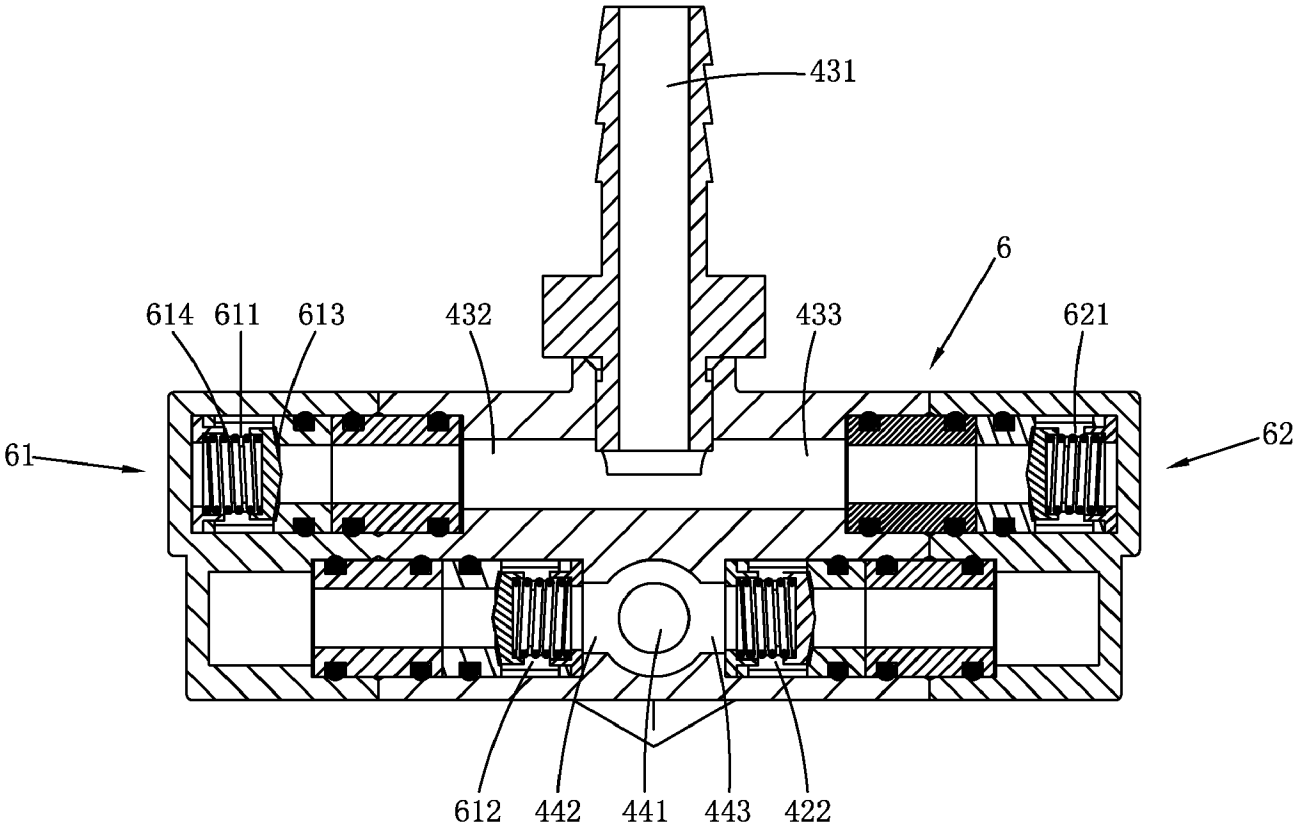
FIG. 8 is a cross-sectional view of the pump in FIG. 4 along a section line BB.
Figure 9:
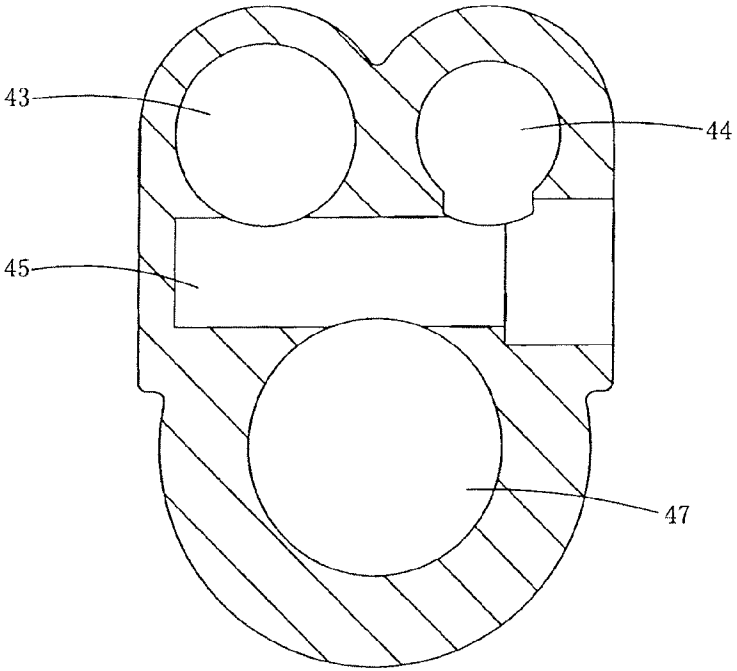
FIG. 9 is a cross-sectional view of the pump in FIG. 4 along a section line CC.

As shown in FIG. 8 and FIG. 9, the pump 4 further has a water inlet chamber 43 and a water outlet chamber 44 that are separated from the central chamber 41. The water inlet chamber 43 is connected to the water inlet 431. The water inlet 431 is configured to connect to an external water source, a water pipe, or a water tap. External water enters the water inlet chamber 43 through the water inlet 431. The water outlet chamber 44 is connected to the water outlet 441. High-pressure water obtained after pressurization is discharged from the water outlet 441, and enters the nozzle 11. The water inlet chamber 43 and the water outlet chamber 44 are disposed in parallel. In this embodiment, the water inlet chamber 43, the water outlet chamber 44, and the central chamber 41 are connected to each other, and a through connection channel is formed. External water enters the water inlet chamber 43, and is eventually discharged from the central chamber 41 through the water outlet chamber 44. In the central chamber 41, water is pressurized by the plunger 5 to form high-pressure cleaning water whose pressure is greater than the atmospheric pressure. The water inlet chamber 43 includes a first water inlet chamber 432 and a second water inlet chamber 433 that are symmetrically disposed. Water entering from the water inlet 431 may selectively enter the first water inlet chamber 432 or the second water inlet chamber 433. The central chamber 41 is separately connected to the first water inlet chamber 432 and the second water inlet chamber 433. In this embodiment, the first water inlet chamber 432 is connected to one end of the central chamber 41, and the second water inlet chamber 433 is connected to the opposite other end of the central chamber 41. The pump 4 further includes connection channels 45 that enable the central chamber 41 to separately connect to the two water inlet chambers, as shown in FIG. 9. In this embodiment, a connection channel 45 configured to connect to the first water inlet chamber 432 is disposed at one end of the central chamber 41, and a connection channel 45 configured to connect to the second water inlet chamber 433 is disposed at the other end of the central chamber 41. An extension direction of the connection channel 45 is perpendicular to an extension direction of the central chamber 41.

The water outlet chamber 44 has the water outlet 441, and the water outlet chamber 44 also includes a first water outlet chamber 442 and a second water outlet chamber 443 that are symmetrically disposed. The first water outlet chamber 442 and the second water outlet chamber 443 are also separately connected to the central chamber 41, and are both connected to the water outlet 441. In this embodiment, the opening direction of the water inlet 431 is perpendicular to the opening direction of the water outlet 441. The first water outlet chamber 442 and the second water outlet chamber 443 are respectively connected to opposite ends of the central chamber 41. Further, the first water outlet chamber 442 and the second water outlet chamber 443 are also connected to the central chamber 41 by using connection channels 45. That is, a connection channel 45 at one end of the central chamber 41 connects the first water inlet chamber 432 and the first water outlet chamber 442 to the central chamber 41. A connection channel 45 located at the other end of the central chamber 41 connects the second water inlet chamber 433 and the second water outlet chamber 443 to the central chamber 41. The water inlet chamber 43, the water outlet chamber 44, and the central chamber 41 are disposed in parallel. Connecting channels 45 respectively connected to the water inlet chamber 43 and the water outlet chamber 44 are disposed at an end portion 47 of the central chamber 41.

As shown in FIG. 4 and FIG. 9, most of the water inlet chamber 43, the water outlet chamber 44, and the central chamber 41 are located in the pump body 461. The upper pump cover and the lower pump cover have respective depressions for forming the end portion 47 of the central chamber 41. When the upper pump cover and the lower pump cover are installed on the pump body 461, the complete central chamber 41 is formed. The upper pump cover 462 and the lower pump cover 463 are further provided with connection channels 45. The connection channels 45 are configured to respectively connect the water inlet chamber 43 and the water outlet chamber 44 to the central chamber 41.

In the present invention, the pump 4 further includes a one-way valve unit 6 configured to control flowing of water in a channel. The one-way valve unit 6 includes a first one-way valve unit 61 and a second one-way valve unit 62 that are symmetrically disposed. The first one-way valve unit 61 is used as an example for description below. In this embodiment, the first one-way valve unit 61 includes a first one-way valve component 611 that is disposed between the first water inlet chamber 432 and the central chamber 41 and a second one-way valve component 612 that is disposed between the central chamber 41 and the first water outlet chamber 442. The first one-way valve component 611 is configured to control flowing of water between the first water inlet chamber 432 and the central chamber 41. The second one-way valve component 612 is configured to control flowing of water between the first water outlet chamber 442 and the central chamber 41. When the first one-way valve component 611 is opened, water in the first water inlet chamber 432 may flow to the central chamber 41. Moreover, water in the central chamber 41 does not flow to the first water inlet chamber 432 because of a unidirectional conduction function of the one-way valve component. That is, the first one-way valve component 611 controls water to flow only from the first water inlet chamber 432 to the central chamber 41. When the first one-way valve component 611 is closed, water in the first water inlet chamber 432 cannot flow to the central chamber 41. In this case, the first water inlet chamber 432 and the central chamber 41 are separated from each other. Similarly, when the second one-way valve component 612 is opened, water in the central chamber 41 may flow to the second water outlet chamber 443. The second one-way valve component 612 has a unidirectional conduction function. When the second one-way valve component 612 is closed, water in the central chamber 41 cannot flow to the second water outlet chamber 443, and the water gathers in the central chamber 41.

In the present invention, the plunger 5 in the central chamber 41 is configured to control opening and closing of the first one-way valve unit 61. Particularly, the plunger 5 may control the first one-way valve component 611 to be opened, and simultaneously control the second one-way valve component 612 to be closed. The plunger 5 may further control the first one-way valve component 611 to be closed, and simultaneously control the second one-way valve component 612 to be opened. That is, the plunger 5 may simultaneously control the first one-way valve component 611 and the second one-way valve component 612 to be in different states of being opened or closed. As shown in the figure, it is defined that when moving to a lower-most end of the central chamber 41, the plunger 5 is in a first critical state. In this state, the plunger 5 starts moving from the lower-most end to an upper end. In this case, the first one-way valve component 611 is opened, while the second one-way valve component 612 is closed. Therefore, water flows from the first water inlet chamber 432 to the central chamber 41, and does not flow out of the central chamber 41. The water gathers in the central chamber 41. Then, the plunger 5 continues moving from the lower-most end of the central chamber 41 to the upper end, and moves to an upper-most end of the central chamber 41. It is defined that the plunger 5 is in a second critical state in this case. In the second critical state, the plunger 5 starts moving from the upper-most end to the lower end. In this case, the first one-way valve component 611 is closed, while the second one-way valve component 612 is opened. Water cannot be supplemented from the water inlet chamber 43 and enter the central chamber 41. Water originally in the central chamber 41 is squeezed by the plunger 5 to generate high pressure, flows to the first water outlet chamber 442, and is sprayed out from the nozzle 11 through the water outlet 441.

Similarly, the plunger 5 may also control opening and closing of the second one-way valve unit 62. The second one-way valve unit 62 includes a third one-way valve component 621 and a fourth one-way valve component 622. The third one-way valve component 621 is disposed between the second water inlet chamber 433 and the central chamber 41, and the fourth one-way valve component 622 is disposed between the central chamber 41 and the second water outlet chamber 443. When the plunger 5 is in the first critical state, the third one-way valve component 621 is closed while the fourth one-way valve component 622 is opened. Therefore, water in the central chamber 41 flows out of the second water outlet chamber 443. When the plunger 5 is in the second critical state, the third one-way valve component 621 is opened while the fourth one-way valve component 622 is closed. Therefore, water flows from the second water inlet chamber 433 to the central chamber 41. Therefore, the second one-way valve unit 62 and the first one-way valve unit 61 can be complementary, thereby improving efficiency of pumping water by the pump. In a process in which the plunger 5 is changed from the first critical state to the second critical state, water entering from the water inlet 431 enters the central chamber 41 through the first water inlet chamber 432, and is discharged from the second water outlet chamber 443 from the water outlet 441 with squeezing of the plunger 5. In a process in which the plunger 5 is changed from the second critical state to the first critical state, water entering from the water inlet 431 enters the central chamber 41 through the second water inlet chamber 433, and is discharged from the first water outlet chamber 442 from the water outlet 441 with squeezing of the plunger 5, and is sprayed out from the nozzle 11.

The first one-way valve component 611 includes a one-way valve 613 and a biasing component 614 for biasing the one-way valve 613. When the plunger 5 is in the second critical state, the biasing component 614 generates a biasing force so that the one-way valve 613 seals the first water inlet chamber 432. As the plunger 5 is changed from the second critical state to the first critical state, a cavity volume near the one-way valve 613 gradually increases. Therefore, pressure generated to overcome the biasing component 614 becomes increasingly high. Eventually, the one-way valve 613 is opened, that is, the first one-way valve component 611 is changed from a closed state to an opened state. The second one-way valve component 612 also includes a one-way valve 615 and a biasing component 616 for biasing the one-way valve 615. A direction of the one-way valve 615 of the second one-way valve component 612 and a biasing direction of the biasing component 616 are opposite to a direction of the one-way valve 613 of the first one-way valve component 611 and a biasing direction of the biasing component 614. Therefore, as the plunger 5 is changed from the second critical state to the first critical state, pressure that can be generated to overcome the biasing component 616 becomes increasingly low. Eventually, the one-way valve 615 seals the first water outlet chamber 442 under the action of the biasing pressure. That is, the second one-way valve component 612 is changed from an opened state to a closed state.

Because the first one-way valve unit 61 and the second one-way valve unit 62 are symmetrically disposed, in a process in which the plunger 5 is changed from the second critical state to the first critical state, the third one-way valve component 621 of the second one-way valve unit 62 is correspondingly changed from an opened state to a closed state, and the fourth one-way valve component 622 is correspondingly changed from a closed state to an opened state.

As shown in FIG. 6, at a side perpendicular to the length direction of the plunger 5, the plunger 5 has a mounting portion 50 configured to install the eccentric mechanism 7. In this embodiment, the mounting portion 50 is a depressed cavity having an inward depression. Moreover, the mounting portion 50 is located in the center of the plunger 5. The eccentric mechanism 7 is fixed in the mounting portion 50 by using a mounting bearing 71. A fixed installation manner is not limited to using the mounting bearing 71, but may also include common manners such as flat-square fitting and spline fitting. Certainly, a person skilled in the art may figure out that the eccentric mechanism 7 and the plunger 5 may also be integrally formed. The eccentric mechanism 7 includes an eccentric shaft 72 and a rotating shaft 33 connected to the eccentric shaft 72. In this embodiment, the eccentric shaft 72 and the rotating shaft 33 are fixedly connected, and a connection manner may be integral formation. The center of the rotating shaft 33 and the center of the eccentric shaft 72 are relatively eccentrically disposed. The rotating shaft 33 is provided with a support bearing 34 having a function of supporting the rotating shaft 33. As can be seen from FIG. 6, eccentricity between the center of the rotating shaft 33 and the center the eccentric shaft 72 is d. The transmission mechanism 3 drives the rotating shaft 33 to rotate around the center of the rotating shaft 33. The eccentric shaft 72 drives, by using the mounting portion 50 and the mounting bearing 71, the plunger 5 to rotate around the center of the eccentric shaft 72. The eccentricity d exists between the rotating shaft 33 and the eccentric shaft 72; therefore, the plunger 5 performs eccentric rotating motion relative to the rotating shaft 33.

The transmission mechanism 3 in this embodiment is shown in FIG. 6. The transmission mechanism 3 is gear drive. The transmission mechanism 3 includes a small gear 31 connected to a motor shaft 21 and a big gear 32 engaged with the small gear 31. The big gear 32 is fixedly connected to the rotating shaft 33. In this embodiment, the rotating shaft 33 and the motor shaft 21 are disposed in parallel. The motor shaft 21 drives, by means of a engaged driving function of the big gear 32 and the small gear 31, the rotating shaft 33 to rotate around the center of the motor shaft 21. The eccentric shaft 72 is fixedly connected to the rotating shaft 33. Therefore, the eccentric shaft 72 also rotates around the center of the rotating shaft 33. Therefore, the eccentric shaft 72 drives the plunger 5 to rotate around the center of the rotating shaft 33. Therefore, the motor 2 can drive the plunger 5 to perform eccentric motion. In this embodiment, the motor 2 drives the plunger 5 to move by using a first-stage gear.

Figure 10:
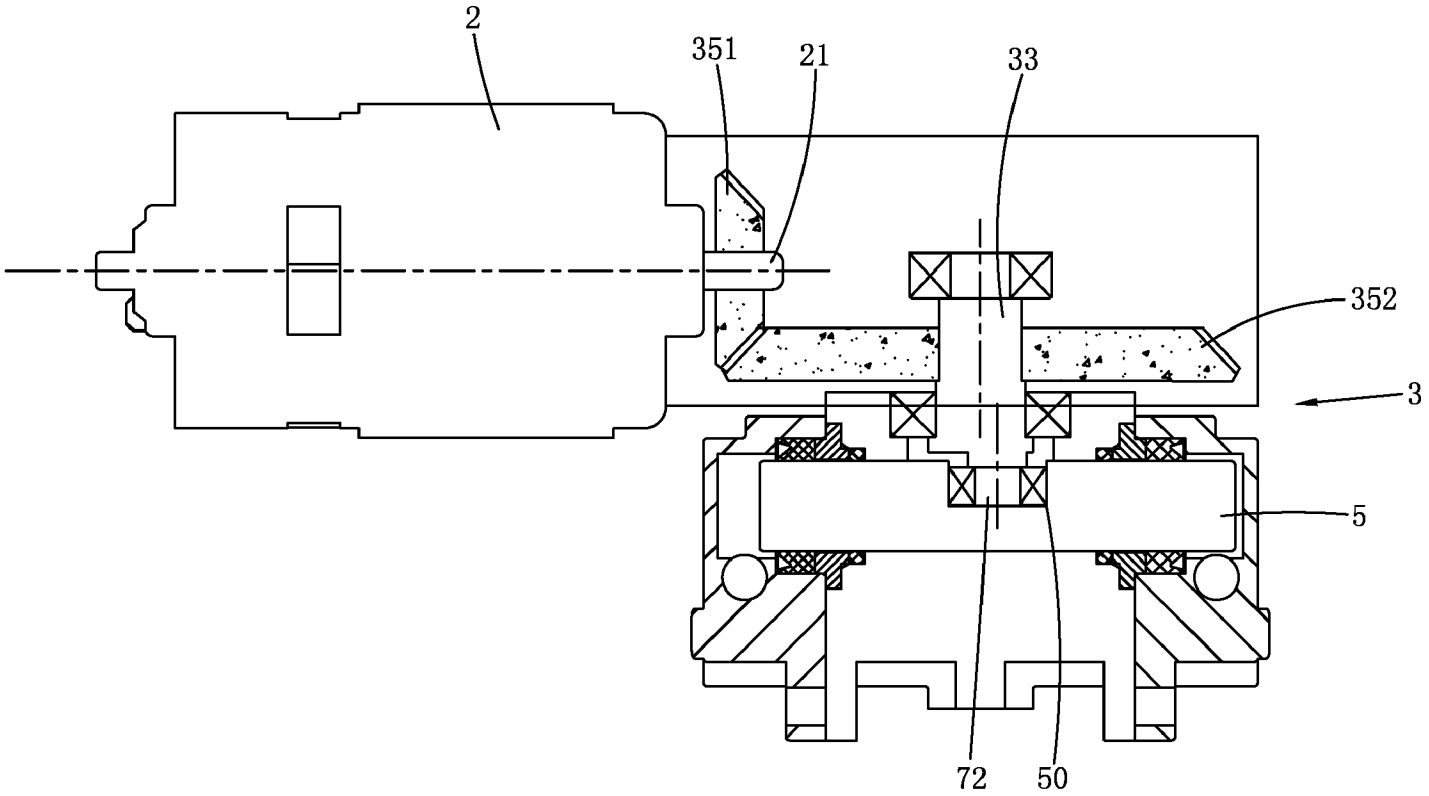
FIG. 10 is a schematic diagram of an embodiment of a transmission mechanism of a high-pressure cleaning machine.

In another embodiment shown in FIG. 10, the transmission mechanism 3 includes a first bevel gear 351 connected to the motor shaft 21 and a second bevel gear 352 on the rotating shaft 33. The first bevel gear 351 and the second bevel gear 352 drive in an engaged manner. The motor shaft 21 and the rotating shaft 33 are perpendicularly disposed. The plunger 5 and the mounting portion 50 are configured to fixedly connect to the eccentric shaft 72 that is eccentrically disposed relative to the rotating shaft 33. With cooperation of the first bevel gear 351 and the second bevel gear 352, the motor 2 drives the plunger 5 to perform eccentric motion. In this embodiment, the motor 2 drives the plunger 5 to move by using a first-stage bevel gear.

Figure 11:
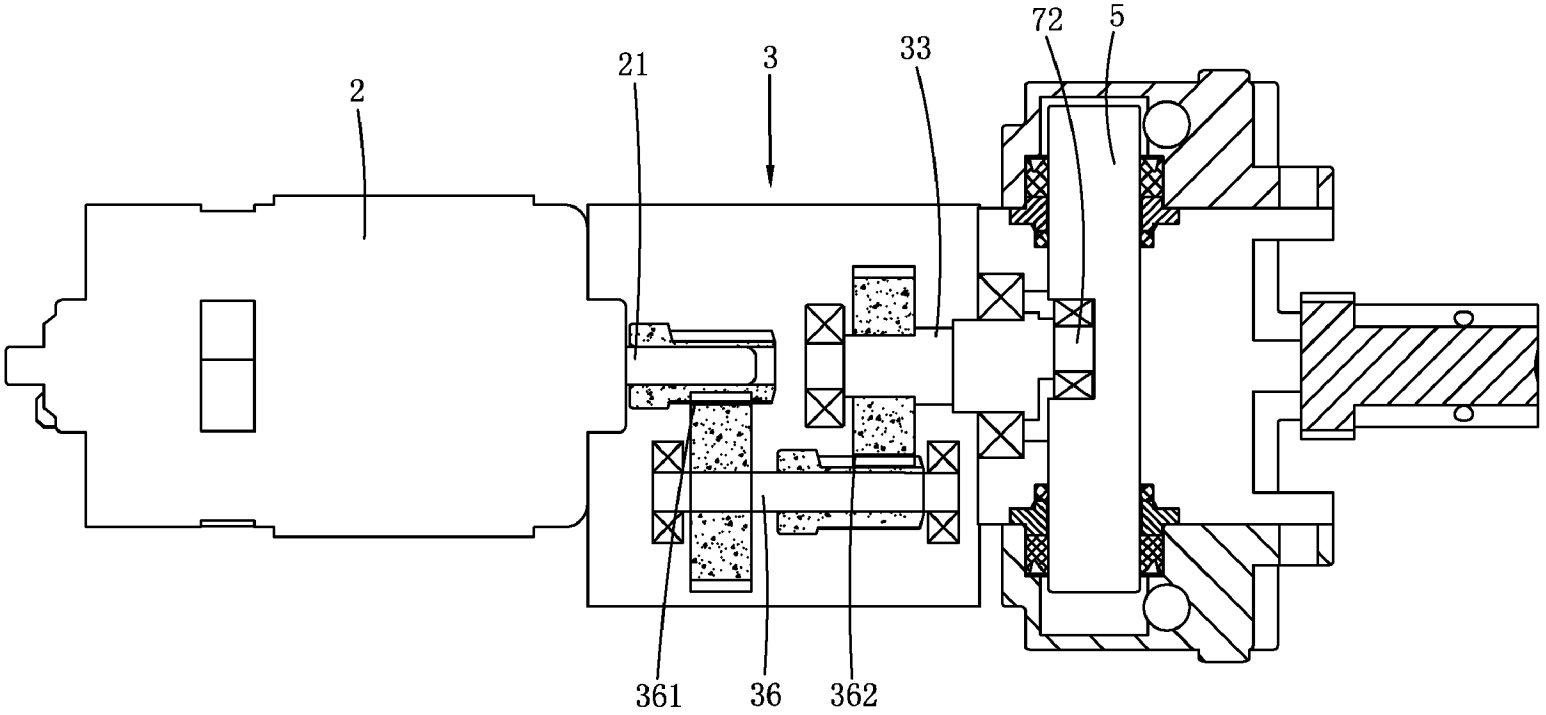
FIG. 11 is a schematic diagram of another embodiment of a transmission mechanism of a high-pressure cleaning machine.

In another embodiment shown in FIG. 11, the motor 2 drives, by means of multi-stage gear drive, the plunger 5 to move. In this embodiment, the transmission mechanism 3 includes an intermediate shaft 36 and the rotating shaft 33 drive-connected to the intermediate shaft 36. The intermediate shaft 36 and the motor shaft 21 are disposed in parallel. The intermediate shaft 36 is drive-connected to the motor shaft 21 by using a first-stage gear 361. The rotating shaft 33 is not directly connected to the motor shaft 21. The rotating shaft 33 is drive-connected to the intermediate shaft 21 by using a second-stage gear 362. On the other hand, the rotating shaft 33 and the plunger 5 are eccentrically connected, which is similar to that in the foregoing embodiments. The rotating shaft 33 and the intermediate shaft 36 are disposed in parallel. An advantage of using this structure is that a drive ratio of the first-stage gear to the second-stage gear may be changed, thereby adjusting a drive output of the plunger 5.

Figure 12:
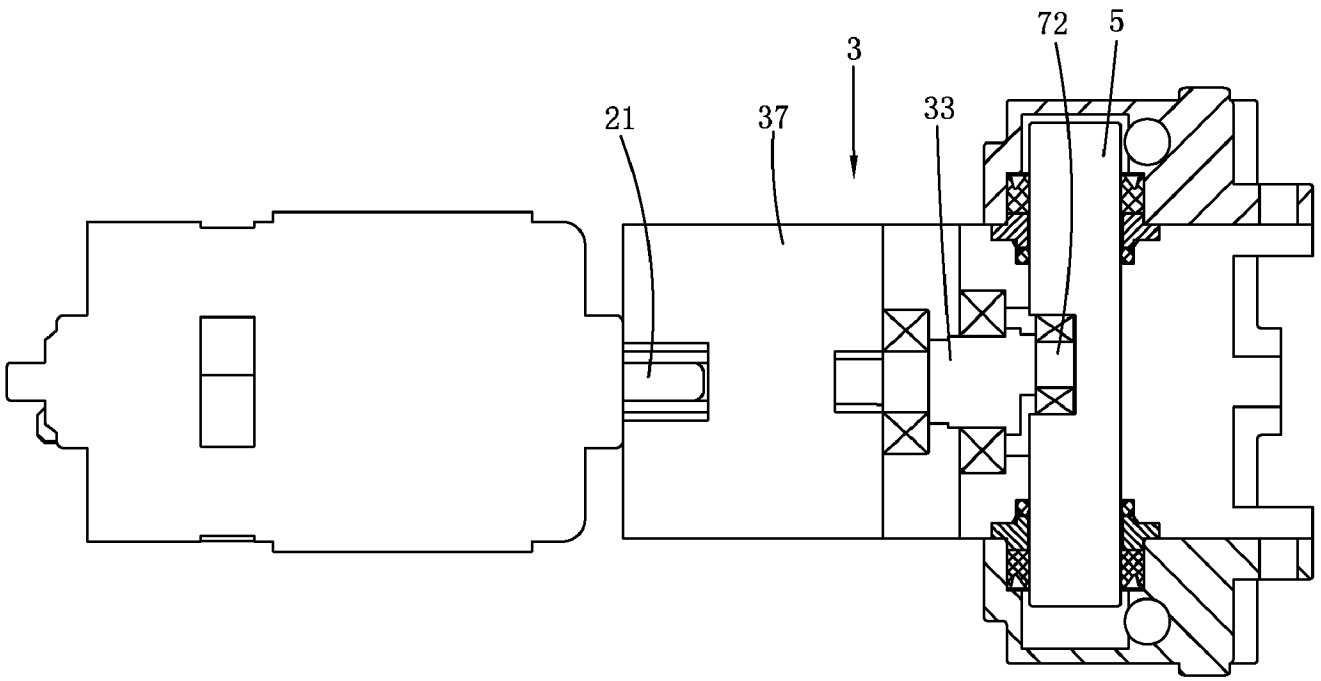
FIG. 12 is a schematic diagram of another embodiment of a transmission mechanism of a high-pressure cleaning machine.

In another embodiment shown in FIG. 12, the transmission mechanism 3 further includes a reduction box 37. The reduction box 37 is provided with sun and planetary gear group. The motor shaft 21 and the rotating shaft 33 are separately drive-connected to the reduction box 37. An advantage of disposing the reduction box 37 is that a drive output of the plunger 5 can be further adjusted.

Figure 13:
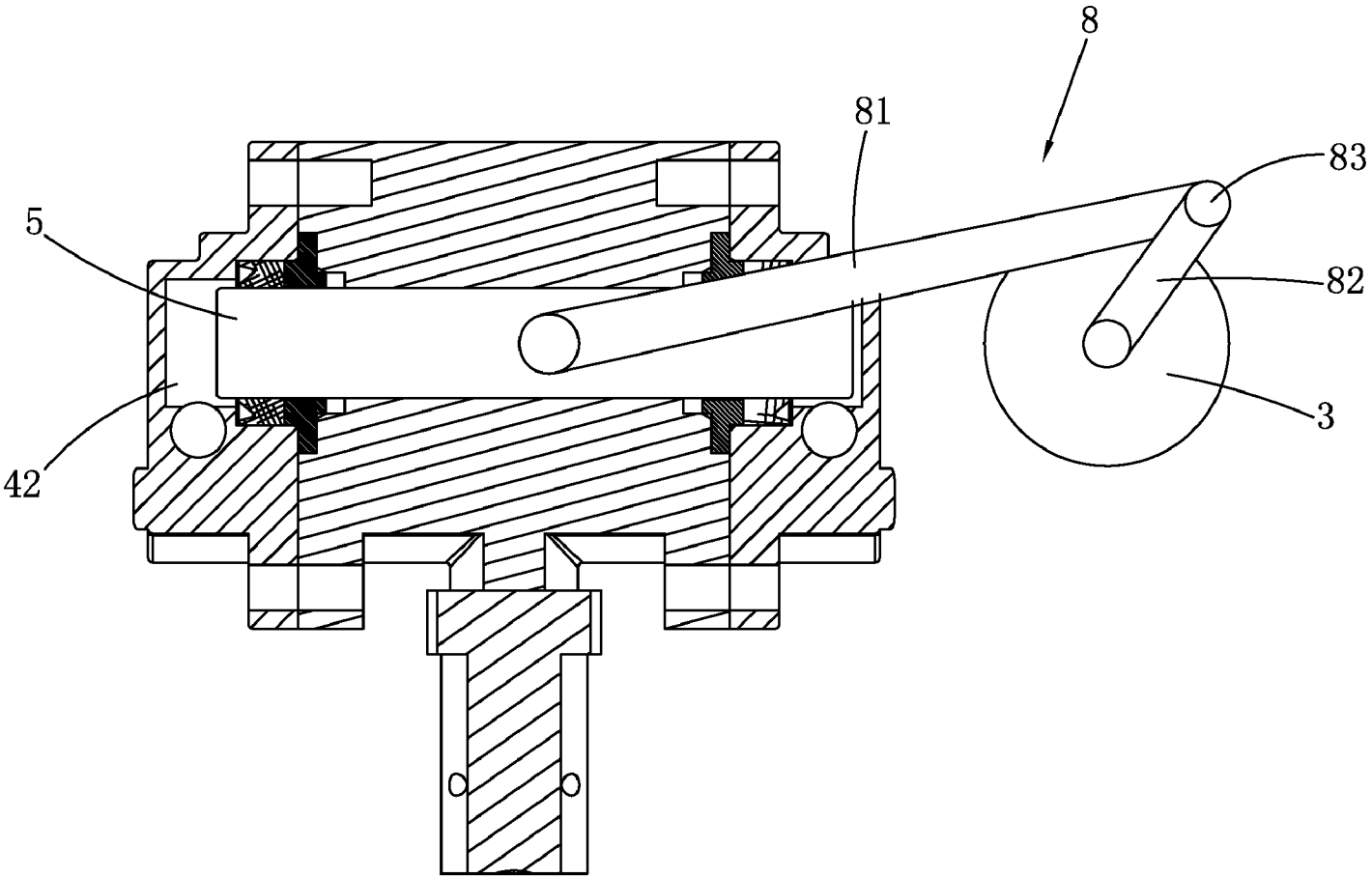
FIG. 13 is a schematic diagram showing that a pump is connected to a plunger by using a crank-link mechanism according to an embodiment of the present invention, where the plunger is in a first critical state.
Figure 14:
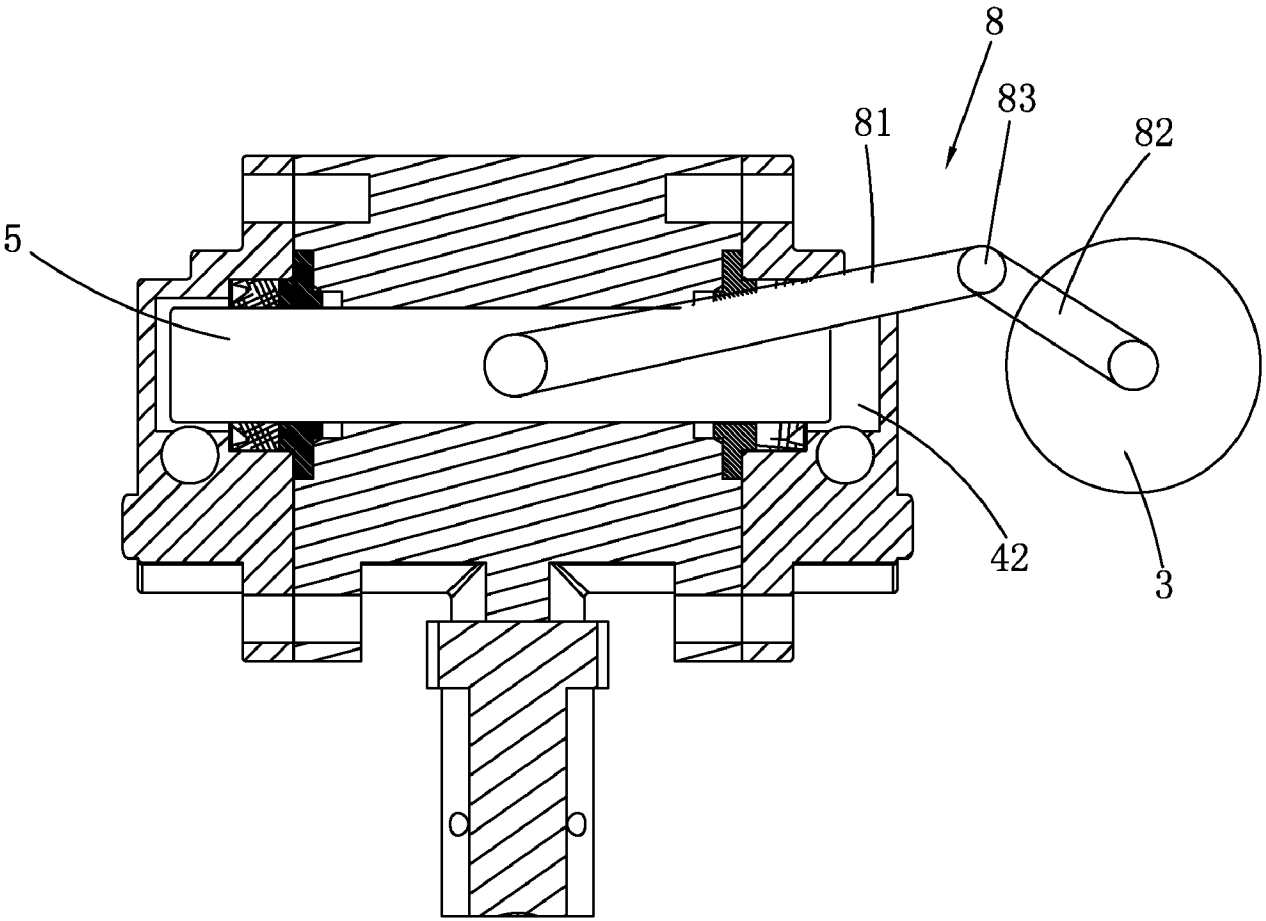
FIG. 14 is a schematic diagram showing that a pump is connected to a plunger by using a crank-link mechanism according to an embodiment of the present invention, where the plunger is in a second critical state.

In the foregoing embodiments, the plunger 5 is connected to the eccentric mechanism 7. The plunger 5 is driven by eccentric rotating motion of the eccentric mechanism 7 to perform linear reciprocating motion along the length direction of the plunger 5. Certainly, the present invention is not limited to that the plunger 5 is connected to the eccentric mechanism 7. The plunger 5 may also be connected to another mechanism to implement linear reciprocating motion along the length direction of the plunger 5. In embodiments shown in FIG. 13 and FIG. 14, the plunger 5 is connected to a crank-link mechanism 8. The crank-link mechanism 8 includes a connecting rod 81 and a crank 82 that are connected to each other. One end of the connecting rod 81 is connected to the crank 82, and the other end of the connecting rod 81 is connected to the plunger 5. One end of the crank 82 is connected to the connecting rod 81, and the other end of the crank 82 is connected to the transmission mechanism 3. A connection part between the connecting rod 81 and the crank 82 forms a pivot point 83, so that the connecting rod 81 and the crank 82 can relatively move around the pivot point 83. As shown in FIG. 13 and FIG. 14, the crank-link mechanism 8 can convert rotating motion of the transmission mechanism 3 to reciprocating motion in the length direction of the plunger 5. FIG. 13 shows that under the action of the crank-link mechanism 8, the plunger 5 is in the first critical state. FIG. 14 shows that the plunger 5 is in the second critical state.

Figure 15:
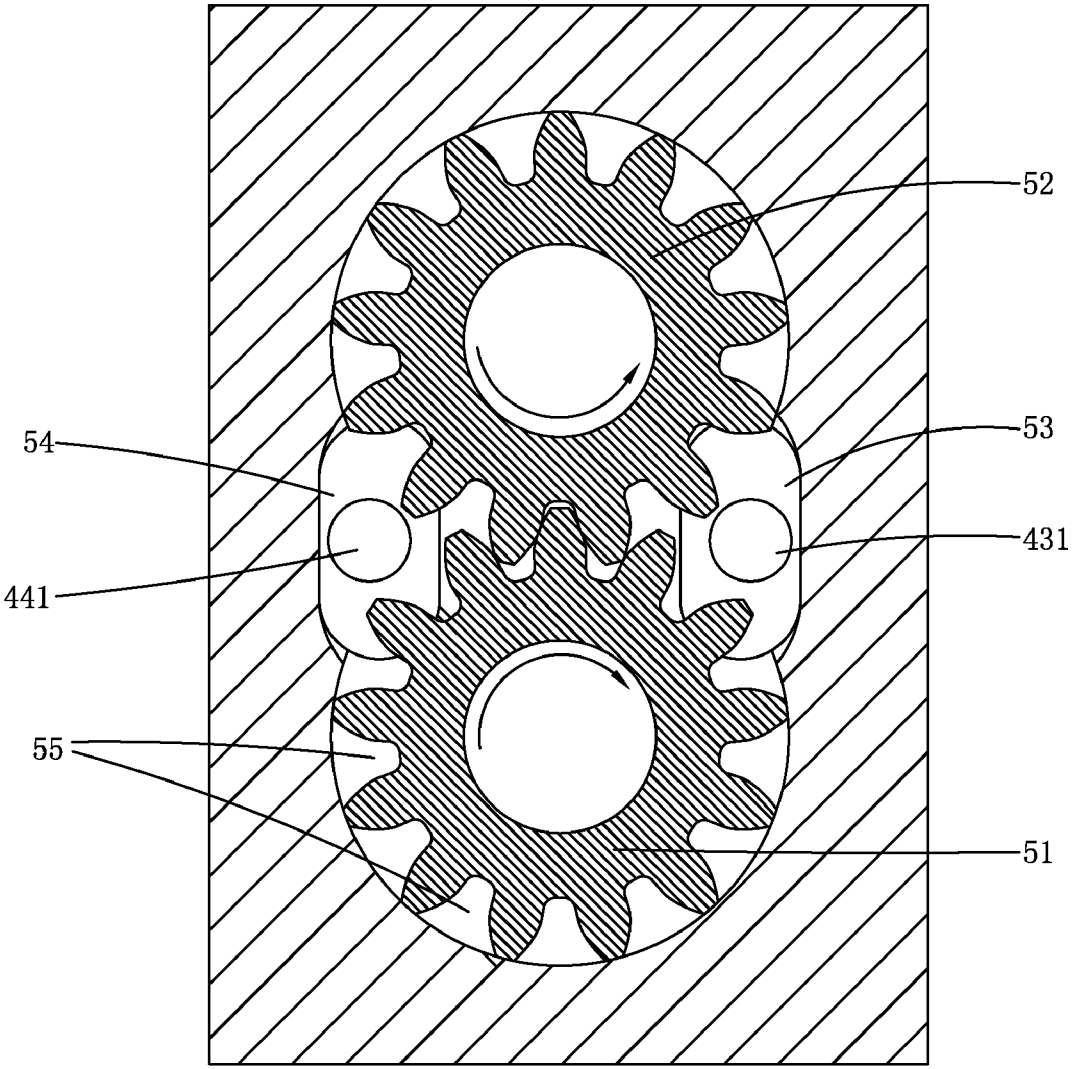
FIG. 15 is a schematic diagram of a pump structure according to a second embodiment of the present invention.
Figure 16:
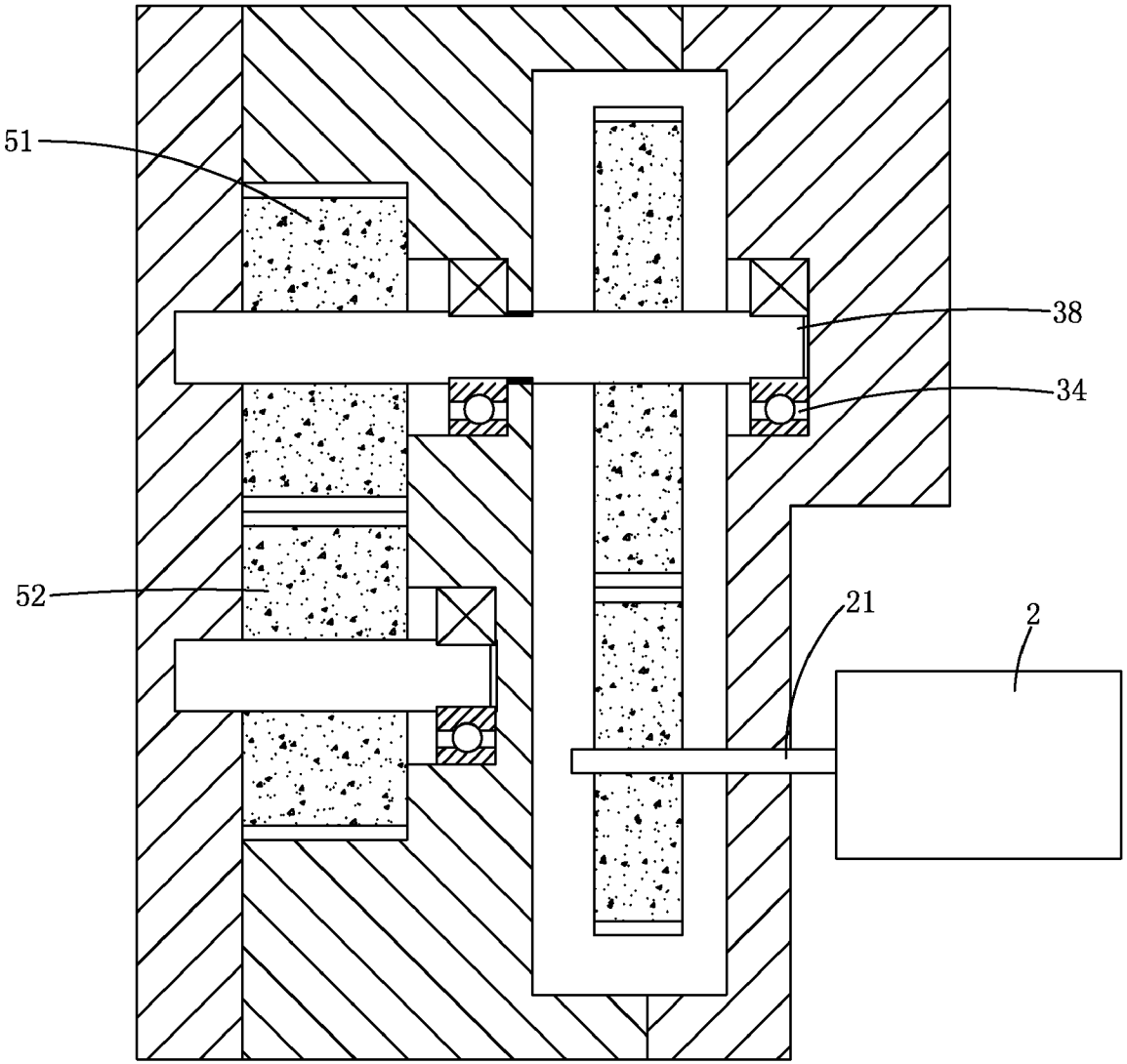
FIG. 16 is a schematic diagram of the pump structure in FIG. 15 from another angle of view.

In embodiments shown in FIG. 15 and FIG. 16, the pump 4 has a driving gear 51 connected to the transmission mechanism 3 and a driven gear 52 engaged with the driving gear 51. The pump 4 further includes a first chamber 53 and a second chamber 54 that are respectively disposed at corresponding two sides of the driving gear 51. The first chamber 53 and the second chamber 54 are separated by the driving gear 51 and the driven gear 52. The first chamber 53 is connected to the water inlet 431. The second chamber 54 is connected to the water outlet 441. Gaps between gears of the driving gear 51 or the driven gear 52 form a delivery chamber 55 for accommodating water. As shown in FIG. 15, a rotation direction of the driving gear 51 is clockwise, and a rotation direction of the driven gear 52 is correspondingly counterclockwise. As the driving gear 51 rotates, the delivery chamber 55 is connected to the first chamber 53. Water in the first chamber 53 enters the delivery chamber 55, and flows to the second chamber 54. In a rotation process of the driving gear 51, a casing inner wall 48 of the pump 4 has a sealing function for the delivery chamber 55. Therefore, water in the delivery chamber 55 does not flow out. When the driving gear 51 rotates to a connecting location between the delivery chamber 55 and the second chamber 54, water in the delivery chamber 55 enters the second chamber 54, and is eventually discharged from the water outlet 441. To improve delivery efficiency, water in the first chamber 53 may further enter the delivery chamber 55 of the driven gear 52, and is delivered to the second chamber 54 by using the driven gear 52. An advantage of using this type of pump is that an entire structure is more compact.

As shown in a schematic cross-sectional view in FIG. 16, the transmission mechanism 3 includes a transmission shaft 38 drive-connected to the motor shaft 21. The transmission shaft 38 is drive-connected to the motor shaft 21 by means of gear engagement. The transmission shaft 38 and the motor shaft 21 are disposed in parallel. The transmission shaft 38 is provided with the support bearing 34. The transmission shaft 38 is connected to the driving gear 51 along an extension direction of an axis of the transmission shaft 38. The motor 2 rotates and drives the transmission shaft 38 to rotate. The transmission shaft 38 drives the driving gear 51 and the driven gear 52 to rotate. In a rotation process of the driving gear 51 and the driven gear 52, water may flow from the first chamber 53 to the second chamber 54. By means of this mechanism, the transmission mechanism 3 and the pump 4 may be integrally disposed, thereby further reducing an entire volume and size.

As described above, in one or more implementation solutions of the transmission mechanism 3, a reduction structure such as a planetary gear mechanism is included. When an input rotation speed range of the pump and a matching rotating-reciprocating conversion structure is constant, compared with using a low-speed motor whose output speed is within the input rotation speed range, entire weights and volumes of the motor and the transmission mechanism can be remarkably reduced by properly using the reduction structure and a high-speed motor. In this embodiment, a no-load speed of the motor 2 is greater than or equal to 10000 rpm, 12000 rpm, 15000 rpm, or 20000 rpm. A no-load output speed of the reduction structure of the transmission mechanism 3 is less than or equal to 3000 rpm, 2500 rpm, 2200 rpm, or 2000 rpm. A reduction ratio of the reduction structure of the transmission mechanism 3 is from 12:1 to 3:1, for example, approximately 10:1, 8:1, 7:1, 6:1, 5:1, or 4:1. Compared with directly using a low-speed motor, the volume and the weight of the motor 2 in this embodiment can be reduced to less than half, thereby improving portability of the high-pressure cleaning machine 1.

The embodiments described above are merely some implementation manners of the present invention. The descriptions thereof are relatively specific and detailed. However, it should not be understood as a limitation to the patent scope of the present invention. It should be noted that, a person of ordinary skill in the art may further make some variations and improvements without departing from the concept of the present invention, and the variations and improvements shall fall within the protection scope of the present invention.

What is claimed is:

1. A handheld high-pressure cleaning machine powered by a direct current and connectable to an external water source using a water pipe; wherein the handheld high-pressure cleaning machine comprises a spray gun comprising:

a housing, wherein a motor, a transmission mechanism connected to the motor, and a pump driven by the transmission mechanism are provided in the housing;

a handle having a front end and a rear end with the front end of the handle connected to the housing behind the motor;

a detachable rechargeable battery pack coupled externally to the handle; and a nozzle connected to a water outlet of the pump whereby water from the external water source may be sprayed out through the nozzle;

wherein the pump comprises a central chamber, a water inlet, a water outlet, a water inlet chamber connected to the water inlet, and a water outlet chamber connected to the water outlet, and wherein a plunger is disposed in the pump, an eccentric mechanism connected to the plunger drives the plunger to perform reciprocating motion, and wherein [the water inlet chamber and the water outlet chamber are located at one end of the plunger, and] the external water source enters the water inlet chamber through the water inlet, is discharged from the water outlet chamber after being pressurized by the central chamber, and is sprayed outward through the nozzle.

2. The high-pressure cleaning machine according to claim 1, wherein the handheld high-pressure cleaning machine comprises a pump body and an upper pump cover and a lower pump cover that are detachably installed on the pump body.

3. The high-pressure cleaning machine according to claim 1, wherein the eccentric mechanism comprises a rotating shaft rotating around a central axis, and an eccentric shaft eccentrically connected to the rotating shaft, and the eccentric shaft is connected to the plunger, and wherein the plunger performs eccentric reciprocating motion relative to the center of the rotating shaft.

4. The high-pressure cleaning machine according to claim 3, wherein the center of the plunger is provided with a mounting portion connected to the eccentric shaft, and a mounting bearing is disposed between the mounting portion and the eccentric shaft.

5. The high-pressure cleaning machine according to claim 1, wherein the high-pressure cleaning machine has a total weight less than or equal to 3 kilograms.

6. The high-pressure cleaning machine according to claim 1, wherein the high-pressure cleaning machine has a total weight less than or equal to 2 kilograms.

7. The high-pressure cleaning machine according to claim 1, wherein the center of gravity of the high-pressure cleaning machine is located in a front-to-rear direction of the high-pressure cleaning machine and is within a range from 8 centimeters behind a rear endpoint of the handle to 8 centimeters in front of a front endpoint of the handle.

8. The high-pressure cleaning machine according to claim 7, wherein the center of gravity of the high-pressure cleaning machine is located in the front to rear direction of the high-pressure cleaning machine and is within a range from the rear endpoint of the handle to 5 centimeters in front of the front endpoint of the handle.

9. The high-pressure cleaning machine according to claim 7, wherein the motor, the transmission mechanism, and the pump form a functional component, and the functional component is located at front end of the handle; and the battery pack is located at the rear end of the handle.

10. The high-pressure cleaning machine according to claim 7, wherein the motor, the transmission mechanism, and the pump form a functional component, and the center of gravity of the functional component is located in front of the front endpoint of the handle; and the center of gravity of the battery pack is located behind the front endpoint of the handle.

11. The high-pressure cleaning machine according to claim 1, wherein the motor, the transmission mechanism, and the pump form a functional component, and the functional component has a weight less than or equal to 1000 grams; and the high-pressure cleaning machine further comprises a battery pack, and the battery pack has a weight less than or equal to 800 grams.

12. The high-pressure cleaning machine according to claim 1, wherein the high-pressure cleaning machine further comprises a battery pack, a rated voltage of the battery pack is from 18 V to 42 V, and a capacity is from 1.5 Ah to 3 Ah.

13. The high-pressure cleaning machine according to claim 1, wherein the high-pressure cleaning machine has a water inlet port configured to connect to the water pipe, wherein the water inlet port is within a range of 5 centimeters in front of or behind the center of gravity of the high-pressure cleaning machine.

14. The high-pressure cleaning machine according to claim 1, having a water inlet port configured to connect to the water pipe, wherein the water inlet port is within a range from 5 centimeters in front of a front endpoint of the handle to 5 centimeters behind a rear endpoint of the handle.

15. The high-pressure cleaning machine according to claim 1, wherein the high-pressure cleaning machine has a total length less than 500 millimeters, and has a height less than or equal to 250 millimeters.

16. The high-pressure cleaning machine according to claim 1, wherein the transmission mechanism comprises a reduction structure, a no-load speed of the motor is greater than or equal to 10000 rpm, and an output speed of the reduction structure is less than or equal to 3000 rpm.

17. The high-pressure cleaning machine according to claim 16, wherein the no-load speed of the motor is greater than or equal to 15000 rpm, and the output speed of the reduction structure is less than or equal to 2500 rpm.

18. The high-pressure cleaning machine according to claim 16, wherein the reduction structure is a planetary gear structure.

19. The high-pressure cleaning machine according to claim 16, wherein a reduction ratio of the reduction structure is from 12:1 to 3:1 or from 10:1 to 4:1.

* * * * *